(12) United States Patent
Stanton

(10) Patent No.: US 10,680,811 B1
(45) Date of Patent: Jun. 9, 2020

(54) SECURITY KEY FOR GEOGRAPHIC LOCATIONS

(71) Applicant: Christopher Robert Stanton, Denver, CO (US)

(72) Inventor: Christopher Robert Stanton, Denver, CO (US)

(*) Notice: Subject to any disclaimer, the term of this patent is extended or adjusted under 35 U.S.C. 154(b) by 0 days.

(21) Appl. No.: 15/419,848

(22) Filed: Jan. 30, 2017

Related U.S. Application Data

(60) Provisional application No. 62/288,728, filed on Jan. 29, 2016.

(51) Int. Cl.
| | | |
|---|---|---|
| *H04L 9/08* | (2006.01) | |
| *H04L 9/32* | (2006.01) | |
| *G06F 16/29* | (2019.01) | |

(52) U.S. Cl.
CPC .......... *H04L 9/0872* (2013.01); *G06F 16/29* (2019.01); *H04L 9/0819* (2013.01); *H04L 9/3226* (2013.01)

(58) Field of Classification Search
CPC ... H04L 9/0872; H04L 9/0819; H04L 9/3226; G06F 16/29; G07C 9/00309; G07C 9/00103; G07C 9/00031; G07C 9/00571; G07C 9/00174; G07C 9/00007; G07C 9/00126; G07C 9/00166
See application file for complete search history.

(56) References Cited

U.S. PATENT DOCUMENTS

| | | | |
|---|---|---|---|
| 8,943,187 B1* | 1/2015 | Saylor ................ | G06F 21/6209 709/223 |
| 2013/0335193 A1* | 12/2013 | Hanson ................ | H04W 12/06 340/5.61 |
| 2017/0161978 A1* | 6/2017 | Wishne .............. | G07C 9/00103 |

* cited by examiner

*Primary Examiner* — Nelson S. Giddins

(57) ABSTRACT

A security key to access a geographic location is sent after one or more threshold requirements are met for an entrant. In aspects, this includes a scheduling requirement and/or a proximity requirement. The security key may be encrypted with a code. The proximity requirement may be satisfied using RFID technology.

2 Claims, 15 Drawing Sheets

SECURITY KEY FOR GEOGRAPHIC LOCATIONS

SECURITY KEY FOR GEOGRAPHIC LOCATIONS

Secure access to geographic locations is useful for a variety of reasons. For example, in real estate sales, leases, building inspections, and the like, entrants may wish to access geographic locations. Further, occupants may wish to have trustworthy entrants enter a geographic location for limited use (such as to complete inspection, view property, gather information, take care of property, perform other services, etc.) while still keeping the property secure from unwanted trespassers.

Occupants or owners, however, often do not want entrants entering a geographic location without security assurances that the entrant is trustworthy. Moreover, occupants do not necessarily want even trustworthy occupants to have unlimited access to property. Further, occupants do not necessarily want to spend the time, energy, or expense to accompany the entrant to the property and/or to verify that the person is trustworthy. Even still, anonymity may be important for both occupant and entrant.

It is with respect to these and other considerations that embodiments have been made. Also, although relatively specific problems have been discussed, it should be understood that the embodiments should not be limited to solving the specific problems identified herein.

SUMMARY

Systems and methods for facilitating access to one or more geographic locations are provided. For example, a system may include a server storing a security engine. The security engine may facilitate the aggregation of information from entrants and geographic locations. The security engine may determine, based on the information received, whether an entrant is cleared to enter a geographic location. After determining that the entrant is cleared to enter, the security engine may send a security key to an entrant. The security key may be a passcode for a lock box, a security system, or the like. In some aspects, the security key is used in combination with RFID and/or Near Field Communication ("NFC") technology to facilitate access.

The security engine may use a variety of tests to determine whether or not a user is cleared for access. These tests (e.g., security checks) may be set by an owner/agent of a geographic location, an administrator of the system, and/or another party. As one example, an agent/owner may desire to have only a licensed real estate agent enter a house. Multiple other types of security checks may be performed. In some aspects, access is facilitated only when a user is on or near the geographic location.

An embodiment of the present technology includes a system that has a processor electronically coupled to a memory. The memory store stores a security engine that receives information regarding an entrant and receives information about a geographic location. The information about the geographic location includes threshold requirements and a proximity threshold. The system also includes an access engine that receives instructions to send a security key to a device associated with an entrant based on instructions from the security engine. The instructions are sent by the security engine after the security engine determines that the threshold requirements are met, in embodiments. The access engine determines that the proximity threshold is met. The system also includes a network interface that sends the security key to the entrant device after the access engine determines that the proximity threshold is met.

Additional embodiments include a computer implemented method. The computer implemented includes sending information regarding an entrant. The information regarding an entrant includes a geographic location and personal information of the entrant. The method also includes receiving confirmation that the geographic location is available for access. The method further includes sending scheduling information, receiving confirmation that the geographic location is available for access at a particular date and time, and receiving a security key.

Further, aspects of the technology include a computer implemented method. The method includes receiving geographic location information. The geographic location information includes a plurality of security thresholds. The method further includes receiving entrant information, comparing the entrant information to the security thresholds, determining, based on the comparison, that the entrant may access a geographic location, and sending a notice to an entrant associated with the entrant information. In embodiments, the notice includes at least one time and date that the entrant may access the geographic location. The method additionally includes receiving a location of the entrant, determining that the location is proximate to the geographic location, determining that the current time and date matches a time/date of the at least one time and date, and sending a security key to an entrant device associated with the entrant.

Aspects of the technology additionally include a geographic location device including a processor and at least one memory in electronic communication to the processor. In aspects, the memory stores instructions that when executed by the processor perform a method. The method may include receiving information related to a geographic location from an input of the geographic location device. The information may include a plurality of thresholds to be used to test a plurality of entrants, and the information may include available dates and times that the geographic location is available for access by a plurality of entrants. The method may further include sending the information related to the geographic location to a security engine, receiving confirmation that an entrant is approved for access to the geographic location, receiving a request to schedule the entrant for access to the geographic location, determining, based on the available dates and times, at least one time and date to schedule the entrant for access to the geographic location, and sending the at least one time and date to the security engine.

This Summary is provided to introduce a selection of concepts that are further described below in the Detailed Description section. This Summary is not intended to identify key features or essential features of the claimed subject matter.

DETAILED DESCRIPTION

While example embodiments have been illustrated and described, it is to be understood that the embodiments are not limited to the precise configuration and resources described below. Various modifications, changes, and variations apparent to those skilled in the art may be made in the arrangement, operation, and details of the methods and systems disclosed herein without departing from the scope of the claimed embodiments.

The current technology relates to computer methods, systems, and devices to provide secure access to one or more geographic locations, such as a house, an apartment, an office building, or other geographic location. While this disclosure may discuss the technology in relation to residential housing, it will be appreciated that access to other geographic locations may be provided using the technology described herein.

Figure 1:
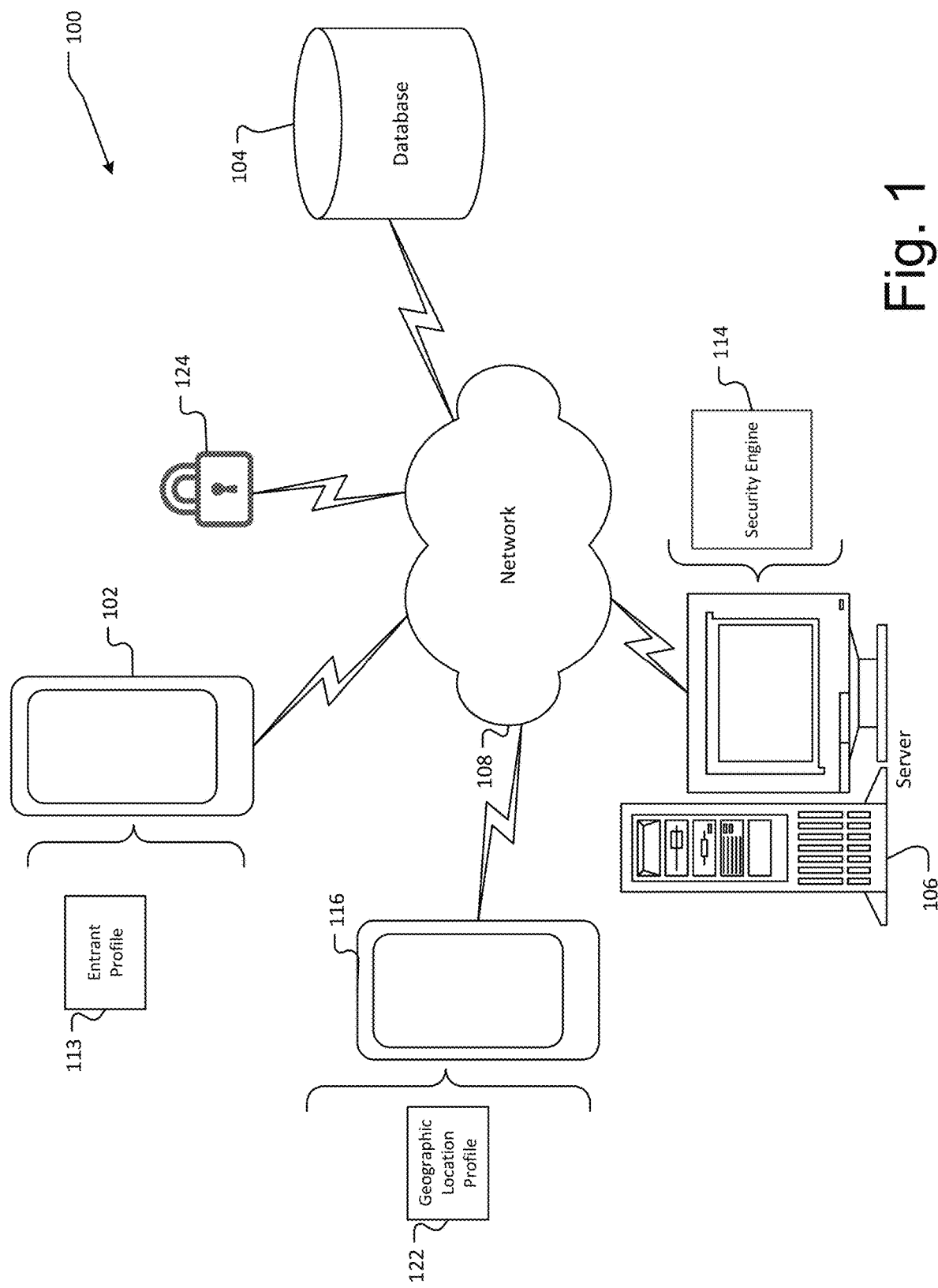
FIG. 1 illustrates a networked-computing environment for facilitating secure access to a geographic location FIG. 2. is an illustration of the results of a security engine performing one or more security checks against one or more threshold requirements.

FIG. 1 illustrates a networked-computing environment 100 for facilitating secured access to a geographic location. As illustrated, FIG. 1 includes an entrant computing device 102, a networked-database 104, a server 106, and a geographic location computing device 116, each of which is communicatively coupled to each other via a network 108.

The entrant computing device 102 may be any suitable type of computing device. For example, the entrant computing device 102 may be one of a desktop computer, a laptop computer, a tablet, a mobile telephone, a smart phone, a wearable computing device, or the like. Additionally, aspects of the current technology include the entrant computing device 102 including an entrant profile 113.

Entrant information to populate an entrant profile 113 may be received from the entrant via, for example, the entrant computing device 102. An entrant may use a computer interface, such as a touch screen, mouse, gesture, keypad, etc., to enter information into the entrant computing device 102. The information may be received via an application designed to receive such information. Additionally, information in the entrant profile 113 may be received from another source, such as a database 104 connected to the network 108. Further, the entrant profile 113 may include a unique identifier (such as an alphanumeric id number) used to associate the information stored in the entrant profile 113 with the entrant.

Entrant profile 113 includes information about the entrant. The entrant profile 113 may include the social security number of the entrant, name, age, income, housing preferences, address, employer information, and other references. The entrant profile 113 may include information related to social-networking websites associated with an entrant. For example, contacts, friends, relationships, etc., of a social networking website may be accessed and stored in an entrant profile 113. Other information may be included in the entrant profile, such as passwords or other information to access other databases with information related to the entrant. For example, information contained within the entrant profile 113 may include information sufficient to access a third party social networking website such as FACEBOOK®, LINKEDIN®, or other social networking web sites. The entrant profile 113 may also include digital information sufficient to recognize the entrant computing device 102 such as a mobile device identifier. Such identifiers include, but are not limited to Android ID, Android Advertising ID Google Advertising ID, UDID, IDFV, and IDFA.

As illustrated, the system 100 also includes a geographic location computing device 116. In aspects of the technology, a geographic location computing device 116 is a device that stores or accesses a geographic location profile 122. In aspects of the technology, the geographic location profile 122 is stored on the geographic location computing device 116. An owner/agent of a geographic location may populate the geographic location profile 122 with information using an application interface.

Geographic information to populate a geographic location profile 122 may be received from an owner/agent of a geographic location via, for example, the geographic location computing device 116. An owner/agent may use a computer interface, such as a touch screen, mouse, gesture, keypad, etc., to enter information into the geographic location computing device 116. The information may be received via an application designed to receive such information. Additionally, information in the geographic location profile 122 may be received from another source, such as a database 104 connected to the network 108. For example, Multiple Listing Services database may be used to access information regarding a geographic location profile 122. Further, the geographic location profile 122 may include a unique identifier (such as an alphanumeric id number) used to associate the information stored in the geographic location profile 122 with a geographic location.

The geographic location profile 122 may include information regarding a geographic location including photographs of the location, physical address, average utility cost, estimated value, list price, GPS coordinates, size, attributes (such as square footage, zoning information, number and types of rooms, etc.). The geographic location profile 122 may also include information about services to be performed (such as dog walking, building maintenance, scheduling, etc.) Additionally, the geographic location profile 122 may also include digital information sufficient to recognize the geographic location computing device 116 such as a mobile device identifier. Such identifiers include, but are not limited to Android ID, Android Advertising ID, Google Advertising ID, UDID, IDFV, and IDFA.

In aspects of the technology, the geographic location profile 122 includes other information such as threshold requirements that must be met in order for an entrant to enter a geographic location. These threshold requirements may be requirements set by an owner/agent of a geographic location associated with the geographic location profile 122. The threshold requirement may include a requirement that entrants that wish to enter the geographic location must have received loan approval, achieved a minimum credit score, and/or not have a felony record, etc. Additionally/alternatively, a threshold requirement may be assigned to the composite of all the attributes of an entrant. Other threshold requirements may include approval of a request for access from a geographic location computing device, proximity to a geographic location, scheduling requirements, etc. The use of threshold requirements to determine whether to facilitate an entrant's access to a geographic location is discussed further with respect to FIG. 2.

The geographic location profile 122 may additionally include proximity thresholds that are selected to be met prior to granting access to the geographic location. This may include proximity thresholds such as the distance that a computing device should be to a geographic location prior to facilitating access. Additionally or alternatively, the proximity threshold may include the requirement that a sensor on or near the geographic location (such as an RFID antenna or tag, wireless network, video, audio signal, BLUETOOTH® or other sensor) can identify an entrant or an entrant's computing device (or an approximate location of the entrant's computing device). The physical proximity of a computing device may also be calculated using GPS. Indeed, any suitable technology may be used to determine the physical location of a computing device (or other device) of an entrant. This physical proximity may be a physical proximity threshold used to determine whether the computing device (or other device) of the entrant is proximate to a geographic location. The geographic location profile 122 may also include a map of the geographic location.

The geographic location profile 122 may also include a security key, which key may be used to gain access to the geographic location. A security key may be a passcode, for example. The security key may be more than one key. In aspects of the technology, a security key may be an alphanumeric key that is used to unlock a physical lock box, disarm/arm a security system, open a garage door and the like. Further the security key may be a key used in combination with nearfield technology and/or RFID technology to allow a user of a mobile device (such as an entrant having a near-field enabled mobile device) to access a secure location.

The geographic location profile 122 may also have information related to an owner of the geographic location(s) associated with the geographic location profile 122. This may include information related to social networking websites associated with said owner. For example, contacts, friends, relationships, etc., of a social networking website may be accessed and stored in a geographic location profile 122. Additionally/alternatively, information (such as a user name and password) for a social networking website may be stored to allow access to the social networking website.

In aspects of the technology, a security device 124 is communicatively coupled to the entrant computing device 102, the geographic location computing device 116, the database 104, and/or the server 106. While the security device 124 is illustrated as being a lock, it need not have any actuating components or be a lock. For example, the security device 124 may be a computing device capable of receiving a security key over the network, such as a security key stored in the geographic location profile 122. The security device 124 may, for example, display the security key to an entrant after one or more threshold requirements and/or one or more proximity thresholds are reached. Additionally/alternatively, the security device 124 may be an RFID tag programmed with information to facilitate access to a secure geographic location. Indeed, the security device 124 may be a smart computing device with full NFC capability to both read, store, process, and send information. Further, the security device 124 may have actuating components that unlock after one or more threshold requirements and/or one or more proximity thresholds are reached. In some aspects, the security device 124 may be programmed to send the security key to the entrant, such as to an entrant computing device 102 (or other associated device), after one or more threshold requirements and/or one or more proximity thresholds are met. In some aspects, the security device 124 sends other information to an entrant (such as to an entrant computing device 102) to facilitate access to a geographic location. In aspects of the technology, no security device 124 is used, and instead communication of the security key to the entrant is facilitated in another way (such as, for example, communication from the server 106 to the entrant computing device 102 over the network 108).

As illustrated, a security engine 114 is housed on a server 106. In aspects of the technology, the security engine 114 uses the information of the entrant profile 113, the geographic location profile 122, and/or the security device 124 to determine whether an entrant has reached a threshold requirement and/or whether an entrant computing device 102 has reached a proximity threshold to access a particular geographic location (or category of geographic locations). In aspects, the security engine 114 uses a combination of information to determine whether to send (or cause to be sent) the security key to the entrant computing device 102 and/or the security device 124.

In aspects, the information in the entrant profile 113 may be sent to the server 106. The security engine 114 may use this information to obtain information from other sources. For example, the security engine 114 may use a social security number, name, address, etc., to access a credit rating of the entrant. Additionally, information from other databases or websites (such as social networking websites) may be obtained by the security engine.

Additionally, the security engine 114 may perform security checks by comparing information in or derived from the entrant profile 113 to information in or derived from the geographic location profile 122. For example, the geographic location profile 122 may include a series of threshold requirements, such as loan approval amount, total insurance associated with entrant profile, credit score of entrant, etc. The security engine 114 may analyze the entrant profile 113 to determine whether the entrant has met the threshold requirements as indicated in the geographic location profile 122. In aspects, the security engine 114 may identify whether the entrant profile 113 indicates whether the entrant is approved for a loan, and if so, for what amount. The security engine 114 may then compare this amount to any requirements stored in the geographic location profile 122. As an additional example, the information may be used to determine a credit score (by accessing the information from third party credit sources). The credit score may be compared to, for example, a threshold requirement credit score requirement provided in the geographic location profile 122. Using information derived from security checks against threshold requirements, the security engine 114 makes a determination as to whether the entrant associated with the entrant profile 113 meets necessary threshold requirements to enable access to a geographical location.

The security engine 114 may make determinations based on information other than threshold requirements. For example, the security engine may perform other fraudulent activity checks. Fraudulent security checks are security checks that are related to activity that is deemed potentially suspicious, and may be used to override any determination made by threshold requirement checks. As an example, the security device may determine that an entrant profile 113 was recently changed in a way that would likely raise suspicion. This may be, for example, a change in the types of properties the entrant is looking to access (e.g., price range, size, district). For example, if the profile of an entrant was seeking to access geographic locations at a certain price, a greater than 20% change may indicate cause a system to flag the entrant/entrant profile as suspicious. Other changes that may cause the system to flag the entrant/entrant profile (resulting, in, for example, denying of access until further action occurs) includes a change in the general area of geographic locations a user is attempting to access, a change in the name, income, social security number, and the like. Additionally, where the entrant computing device 102 provides information related to location (such as, for example, GPS data) the security engine 114 may analyze the location information to identify an unusual change in location (such as the device being in one location, and then suddenly appearing in another location several miles away).

Additionally, aspects include the security engine 114 facilitating/obtaining qualified references for an entrant to access a geographic location associated with the geographic location profile 122. For example, the security engine 114 may gather or identify relationships that a potential entrant has on a social network site. This may be compared to relationships that an owner of a geographical location has. A person common to the relationship may be identified. The security engine 114 may identify the total number of connections between the entrant and the geographic owner or representative. A threshold requirement may have been established and stored in the geographic location profile related to the minimum number of connections an entrant may be away from the owner or representative of a geographic location. Alternatively, the threshold requirement of a reference from a shared connection may have been set. For example, a common connection may provide a reference for an entrant via a variety of means.

After the security engine 114 determines that the entrant profile 113 satisfies a variety of threshold requirements reflected in the geographic location profile 122 or other threshold requirements, an entrant computing device 102 has satisfied a proximity threshold, and/or has passed any fraudulent activity check, the security engine 114 may facilitate access to the geographic location. For example, the security engine 114 may cause a security key to be sent to the entrant computing device 102 and/or the security device 124. The security key may be temporary and may be associated with the entrant profile 113 and/or the entrant computing device 102.

While FIG. 1 illustrates the entrant profile 113 being stored on an entrant computing device 102, the geographic location profile 122 being stored on a geographic location computing device 116, and the security engine 114 being stored on a server 106, it will be appreciated that the entrant profile 113, the geographic location profile 122, and the security engine 114 may be located on or more devices in a distributed system. For example, a mobile device may include a thin application that facilities user interaction with a geographic location profile 122 and/or entrant profile 113 stored on a server. Alternatively/Additionally, the security engine may be stored locally on a computing device of an entrant and/or a geographic owner or agent. Other configurations are contemplated.

Figure 2:
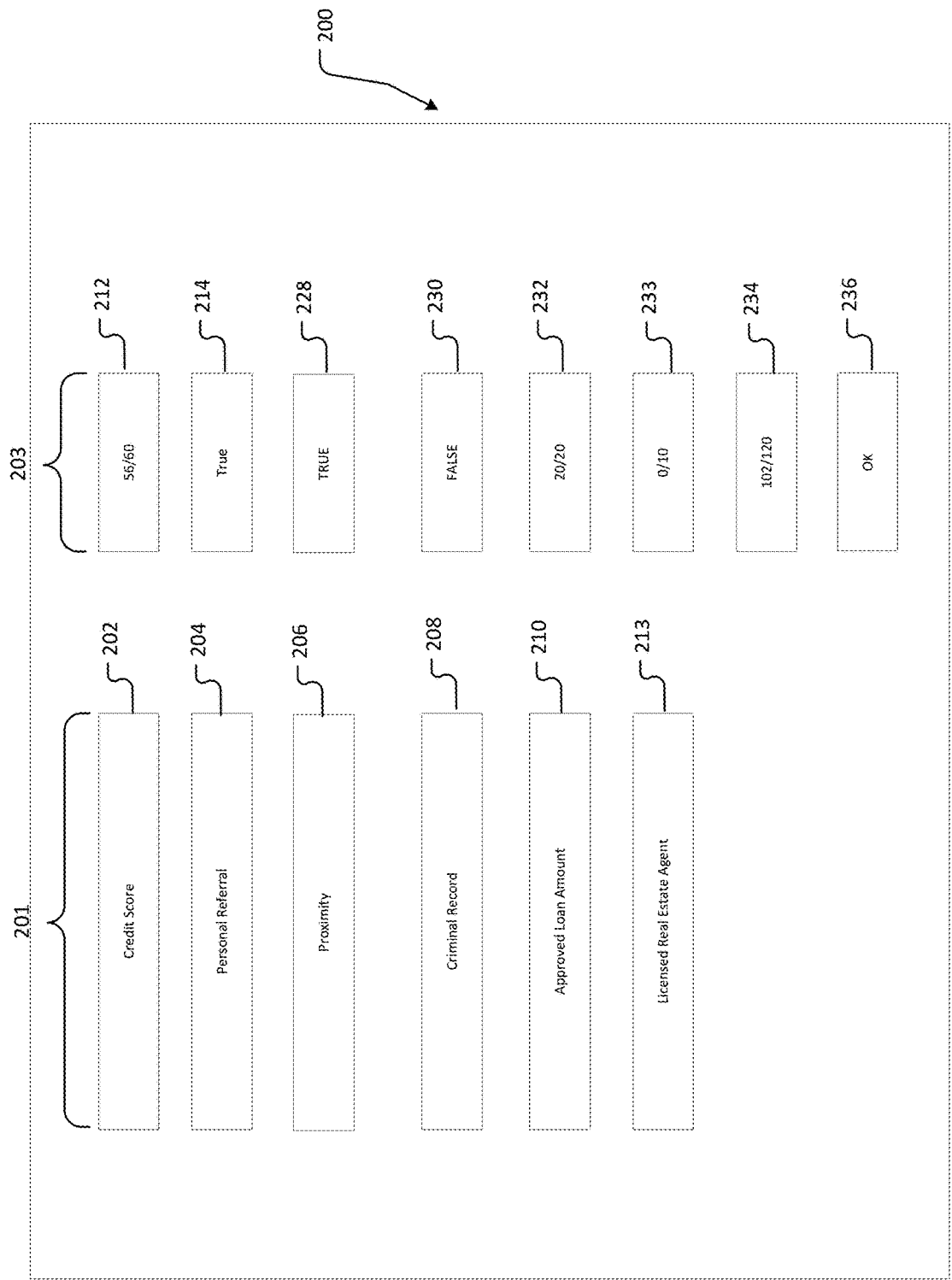

FIG. 2. is an illustration 200 of the results of a security engine, such as security engine 114, performing one or more security checks against one or more threshold requirements. In aspects, threshold requirements used to make determinations as to each security check are set by information received and/or stored in a geographic location profile.

Threshold requirements may come from a geographic location profile. For example, in a geographic location profile there may have been set a variety of threshold requirements for personal referrals, criminal record, loan amount, scheduling availability, license/insurance/other credentials (for example, in the case of a contractor, broker, or service provider), ect. Additionally, how the security check will be evaluated (e.g., binary or numerical, as discussed below) may also have been determined by information stored in a geographic location profile.

Information regarding threshold requirements and/or security check types may be obtained from other sources. For example, an administrator of the security engine may require a security check to always check that an entrant is within a certain proximity of the geographic location, or that the entrant has accepted the terms of service in order to use the system associated with a security engine. In such an instance, the security engine would not facilitate access to a geographic location unless the terms of service were accepted, for example. Other types of security checks set by the administrator include evidence of fraudulent activity, as described above.

Further, information to perform each security check may have been directly or indirectly obtained from an entrant profile or another source. For example, an entrant profile may include information sufficient for the security engine to obtain a credit score, loan approval amount, criminal record, scheduling information, proximity of entrant, etc. Such information may be used to perform a security check. The proximity check may be performed by obtaining information from an entrant device, an RFID or NFC apparatus that read a tag associated with an entrant, or some other sensor capable of determining the location of an entrant.

As illustrated, 1-n security checks 201 are performed resulting in 1-n numerical scores 203 being assigned to each 1-n security check 201. In aspects, a security engine may perform a security check and assign a binary score to the security check. For example, if a security check returns a negative result (such as a credit score below a minimum threshold requirement) then the security score associated with the security check will be set to fail. On the other hand (in this example), if the security check returns a positive result (such as the entrant is within proximity of the geographic location) the security score associated with the security check will be set to pass.

In aspects, binary scores may be necessary but not sufficient for a security engine to grant access to a secured geographic location. For example, a failed security check that has a binary value may cause the overall security check to fail, and, in aspects the security engine will not facilitate access to a geographic location. However, a passed security check may indicate that an entrant is allowed access to the geographic location based on the passed security check, but other security checks may have to be passed. For example, a pass/fail result 236 may be used to track whether any score of the 1-n numerical scores 203 that are binary scores have failed. If none of the binary scores have failed, the pass/fail result 236 may be set to pass. If any binary score was assigned a fail, the pass/fail result 236 may be set to fail.

In other aspects, the security engine performs a security check and assigns a numerical score associated to the security check. For example the security check may compare an entrant's loan approval amount with a threshold requirement. In aspects, a geographic location may be associated with a desired loan, such as an amount of $200,000. The entrant, however, may only be approved for $185,000. In this example, the loan amount security check may have a score of 185/200. Such a score may be normalized by multiplying the fractional amount by a normalizing factor. This may allow one (such as a user associated with a geographic profile or an administrator of the system) to manipulate the importance of any security check associated with a numerical score against other security checks with numerical scores. While a linear function is discussed above, any function that generates a numerical score may be used.

In aspects, some or all security checks in the 1-n security checks 201 may be assigned a numerical score. All numerical scores may be added together, and the sum may be input into the composite score 234. This composite score 234 may be compared against a threshold requirement to determine whether the security engine facilitates access to a geographic location. Alternatively, this composite score (or indicia thereof) may be sent to an owner/agent of a geographic location along with a request for final approval to access a geographic location.

In aspects, both the composite score 234 and the pass/fail result 236 will be used to determine whether to allow access to a geographic location. For example, in aspects, the composite score 234 will have to be above a predetermined threshold and the pass/fail result 236 will have to pass in order for the security engine to facilitate access to a geographic location. In other embodiments, only the composite score 234 or the pass/fail result 236 is used to determine whether to facilitate access to a geographic location.

While FIG. 2 illustrates six security checks with six corresponding scores, it will be appreciated that more or less security checks may be used to determine whether a security engine facilitates access to a geographic location. Additionally, while specific security checks are referenced, different security checks may be used. Further, through the security checks illustrated may have a binary or a numerical score associated with the security check, a numerical score or binary score may be used for any security check. Indeed, the same security check may have both a binary score and a numerical score. Further, a security check may be performed multiple times resulting in an updated corresponding security score and/or change whether a security engine will facilitate access to a geographic location.

As illustrated, a credit score security check 202 has a numerical score 212 of 56/60. This score may be determined by a simple calculation such as the total credit score of a person divided by the maximum credit score, and then normalized to have the weight of the credit score be a factor of 60. This may be used to allow ones credit score to be hidden from a user associated with a geographic location profile and to control the weight that a credit score has versus other numerically scored credit checks. Indeed, the numerical score 212 may be totaled with other numerical scores in the 1-n numerical scores 203 to hide any particular contributing score. That is, in some aspects, a normalization factor may be applied to hide individual score contributions. In additional/alternative embodiments, a credit score security check 202 may be binary such that it is compared to a threshold and assigned a pass or fail binary score. For example, a user associated with a geographic location may set a minimum credit score of 680 to have access to a geographic location, but may also give points for any amount above 680. The points may later then be added to a composite score 234 and compared to a total score threshold requirement.

Further, as illustrated, a personal referral security check 204 is present. The personal referral security check 204 has a binary score 214. As illustrated, the binary score 214 is set to true. In aspects, this is set true if an agent/owner associated with a geographic location has received a personal referral from a person known both to the agent/owner and the entrant. For example, the personal referral may have come from someone identified as a contact within an n-number of connections on a social networking website. In additional/alternative embodiments, the personal referral security check 204 may be assigned a numerical score.

Proximity security check 206 describes whether an entrant is proximate to a geographic location. This may occur by proximity security check 206 determining whether a device associated with the entrant, such as an entrant computing device 102, is within a certain proximity of a geographic location. In aspects, the proximity security check 206 may have a value 228 set to true if an entrant device has GPS enabled and it is identified that the entrant device is proximal to a geographic location, such as the location of the property. The proximity may be determined by other means such as wireless communications, near field technology, cellular technology, and the like. Additionally, the proximity of an entrant may be determined by other means, such as video, motion detection, and/or audio detection.

As illustrated a criminal record security check 208 is present. The criminal record security check 208 has a binary value 230 associated with it. For example, this may occur when a potential entrant does not have a felony criminal record, any criminal record, and or a criminal record indicating dangerous crimes. The criminal record security check 208 may also be assigned a numerical score, in aspects.

An approved loan amount 210 security check is present. This loan security score 232 may be determined by dividing the total approved loan amount by the threshold requirement and normalizing by some value, in this case 20. As illustrated, the score is 20/20, indicating that the entrant has a loan value to score the maximum score. For example, an agent/owner associated with a geographic location may have set an asking price for a geographic location, and a loan approval amount equaling the asking price may cause the security engine to assign the loan security score 232 of 1. The score may then be normalized to have a weight, such as a weight of 20 out of 120, as is illustrated.

A licensed real estate agent security check 213 is also shown. The licensed real estate agent security check 213 determined the real estate score 233. In aspects, the security engine may assign a numerical value based on a simple step function, such as 0 if the entrant is not a licensed real estate agent and 10 if entrant is a licensed real estate agent. In other aspects, the real estate score 233 may be set to a binary value.

As discussed above, the composite score 234 may total each of the 1-n scores that are assigned a numerical score. This composite score 234 may then be compared against some composite threshold to determine if the security engine will facilitate access to a geographic location. Additionally/alternatively the pass/fail result 236 will be used to determine whether a security engine will facilitate access to a geographic location.

Figure 3:
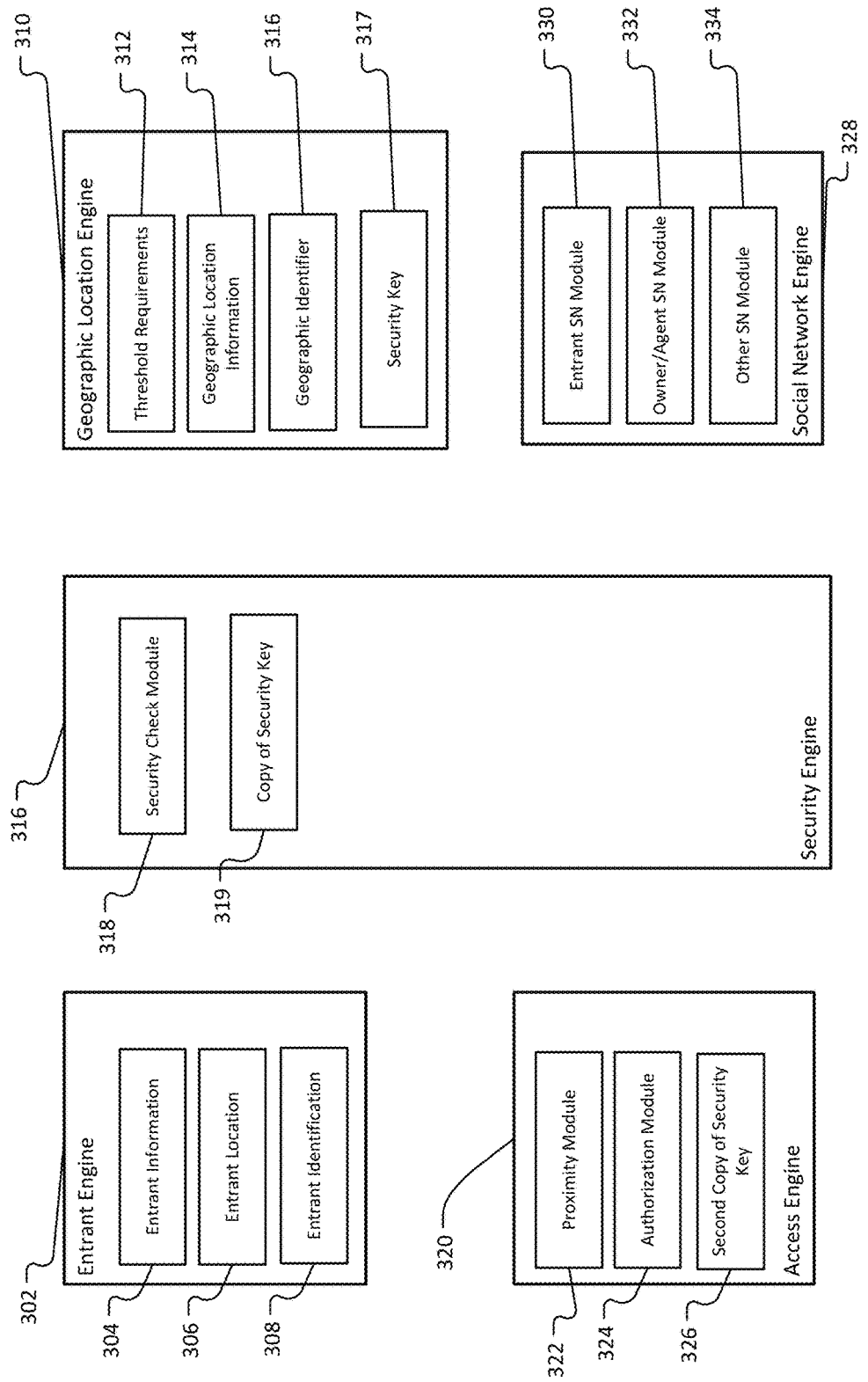
FIG. 3 illustrates an embodiment of a system to provide secure access to a geographic location.

FIG. 3 illustrates an embodiment of a system to provide secure access to a geographic location. System 300 includes an entrant engine 302, the geographic location engine 310, security engine 316, access engine 320, and external reference source 321.

As illustrated, the system 300 has an entrant engine 302 that includes entrant information 304, which entrant information 304 is associated with an entrant. The entrant information 304 may be information included or derived from an entrant profile as discussed above with reference to FIG. 1, which includes name, address, credit score, housing preferences, criminal record, as well as other information. The entrant information 304 may also include information from other sources, such as third-party databases or websites.

Further, the entrant engine 302 also includes entrant location information 306. Entrant location information 306 may come from a device associated with an entrant, such as an entrant computing device described above with reference to FIG. 1. In alternative/additional embodiments, entrant location information 306 may come from another device, such as a security device 510. Entrant location information may include the history of the location of the entrant and/or the entrant's device(s).

Entrant engine 302 may include an entrant identification 308. The entrant identification 308 may be a unique identifier that associates the entrant information 304 (in some instances, including the entrant profile), the entrant location information 306, and/or an entrant device with an entrant. The entrant identification 308 may also be used to uniquely identify an entrant with a variety of information, information sources, and other data.

System 300 also includes a geographic location engine 310. The geographic location engine 310 includes threshold requirements 312 associated with a geographic location. The threshold requirements 312 may be the same or similar as those discussed with reference to FIGS. 1 and 2. For example, threshold requirements 312 may include threshold requirements received from an owner or agent of a geographic location. The threshold requirements 312 may be stored in and/or associated with a geographic location profile, such as geographic location profiles similar to or the same as those discussed above with reference to FIGS. 1 and 2.

System 300 also includes geographic location information 314. Geographic location information 314 may include and be obtained from a geographic profile, such as the geographic profile described with reference to FIGS. 1 and 2. In aspects, geographic location information 314 includes information associated with one or more geographic locations. For example, geographic location information 314 may include GPS coordinates, physical address(es), property attribute information (including size; square footage; floors; number/types of rooms, such as bedrooms or bathrooms; tax information; zoning information; school district; age; asking price; etc.), a digital map of the property, etc. The geographic location information 314 may also include information related to the types of services to be performed (sprinkler shut-off, dog walking, radon detection, appliance installation, etc.).

The geographic location engine 310 includes a security key 317. The security key 317 is a key used to facilitate access to the geographic location, in aspects. For example, the security key 317 may be a key for a security code, a lock box, or some other device that an entrant may use to gain access to a geographic location. The security key 317 may also be associated with a tag of an RFID and/or NFC enabled device.

The geographic location engine 310 includes a geographic location identifier 315. The geographic location identifier 315 is a unique identifier associated with a geographic location. The geographic location identifier 315 associates the geographic location information 314, the threshold requirements 312, and the security key 317.

System 300 also includes a security engine 316. Security engine 316 includes a security check module 318. Security check module 318 determines whether threshold requirements are met and performs other tests to determine whether to facilitate access to a geographic location. Indeed, the security check module 318 may perform the same functions in the same or similar manner as the security engine 114 and or the security engine with reference to FIGS. 1 and 2. For example, the security check module 318 uses information from the geographic location engine 310, such as the threshold requirements 312, the geographic location identifier 316, and/or the geographic location information 314 to facilitate access to a geographic location. Additionally, the information from the geographic location engine 310 is, in some embodiments, used in combination with information in the entrant engine 302, including the entrant information 304, the entrant location information 306 and the entrant identification 308 to facilitate an entrant's access to a geographic location.

System 300 also includes an access engine 320. In aspects, the access engine 320 includes proximity module 322, authorization module 324, and a second copy of a security key 326. The proximity module 322 may determine whether an entrant is proximate to a geographic location. For example, the proximity module 322 may determine whether one or more devices associated with an entrant is within a certain proximity (such as within the boundary of the geographic location as determined by property rights) of the geographic location associated with the geographic location identifier 315.

The proximity module 322 may use a variety of techniques to identify whether a device associated with an entrant is proximate to the geographic location. This includes wireless technology, mobile technology, cellular technology, BLUETOOTH® technology, RFID, NFC communication and the like. For example, it may be determined (using preferences stored in the geographic location information 314) that entrant device must be within 5 feet from the geographic location in order to provide a copy of the security key 326 to the entrant. The proximity module may use location information (such as GPS) of a device associated with an entrant to determine an entrant is proximate (e.g., meets a proximity threshold of 5 meters) to the geographic location. In alternative/additional aspects of the technology, the proximity module 322 may work with a NFC reader to determine that a device associated with an entrant is in proximity to the geographic location. For example, an entrant may have a tag that stores data including the entrant identification 308. This tag may be read by an NFC and/or RFID enabled device on the property to determine that the entrant is proximate to the geographic location. Other technologies may be used.

In aspects, the authorization module 324 determines whether to provide an entrant with the second copy of the security key 326 and/or whether to actuate a locking mechanism. For example, the authorization module 324 may receive information from the proximity module 322 that indicates a device associated with an entrant (such as a smart phone, computer, and/or RFID tag) is within proximity of the security device. The authorization module 324 may then determine that the entrant is authorized to have the security key (such, as for example, by receiving information from the security engine 316 that the entrant associated with the entrant identification 308 is authorized to receive the security key 326 when an entrant device is located on/near (proximate to) the geographic location (as determined by, for example, wireless, GPS, cellular, BLUETOOTH®, or other technology)). Additionally/alternatively, the authorization module 324 may determine to actuate a locking mechanism based on the determination that the entrant is proximate to the geographic location.

FIG. 3 also illustrates a system 300 as also including a social network engine 328. In aspects, social network engine 328 has entrant social network module 330, owner/agent social network module 332, and other social network module 334. Each module may have information or be able to access information related to the contacts of an entrant, an owner/agent, or another person, respectively. The social network engine 328 may use the information to identify one or more commonly shared connections. Commonly shared connections, for example, may be identified by comparing an entrant's social networks connections with an owner/agents social network connections, and attempting to identified one or more shared connections based on the comparison. Additionally, the social network engine 328 may determine the number of shared connections between an agent/owner of a geographic location and an entrant.

Figure 4:
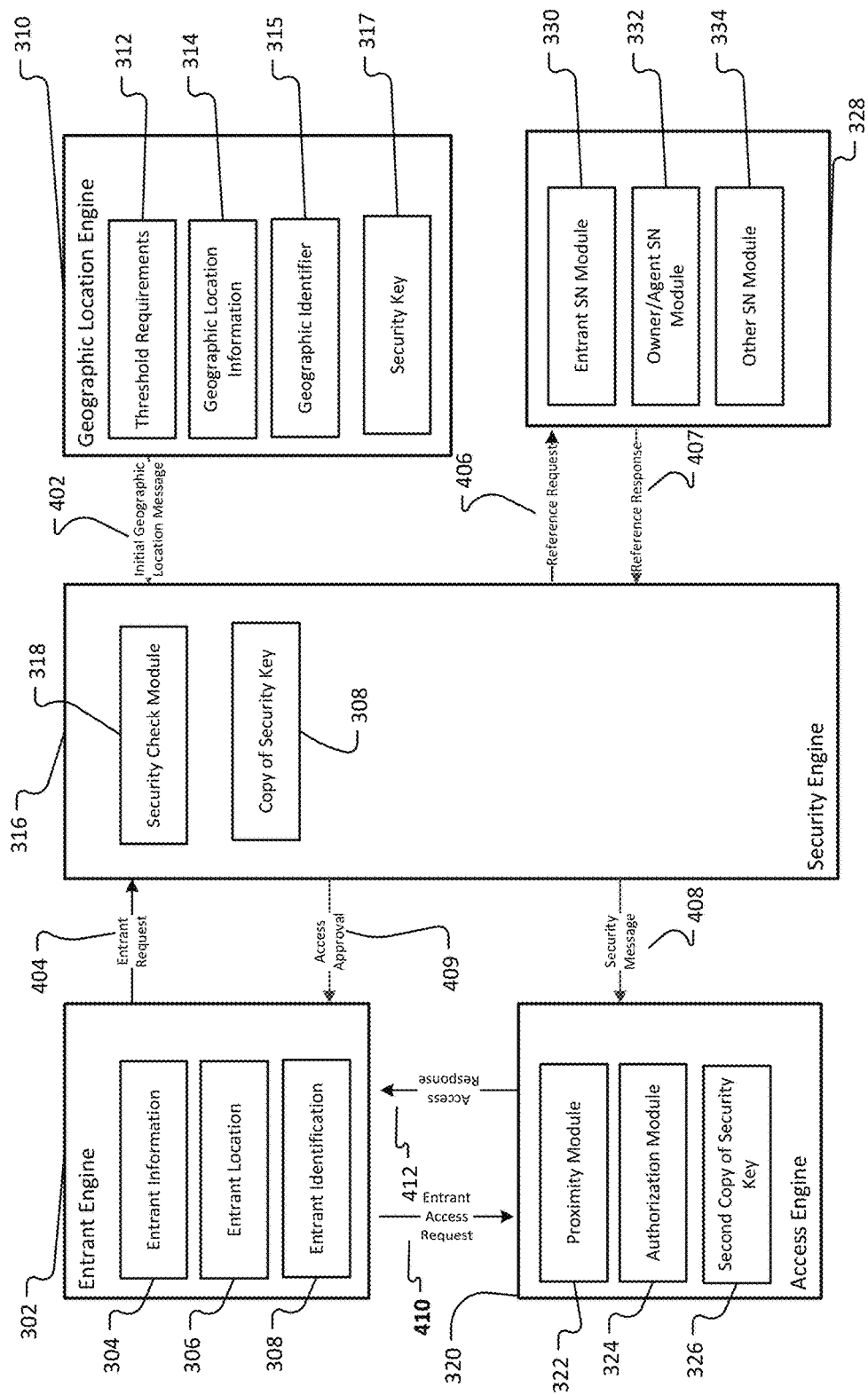
FIG. 4 illustrates a system with communication streams for facilitating access to geographic locations.

FIG. 4 illustrates a system 400 with communication streams for facilitating access to geographic locations. It will be appreciated that elements in FIG. 4 like numbered as elements in FIG. 3 will have the same or similar properties as those discussed with reference to FIG. 3.

System 400 includes an initial geographic location message 402. As illustrated, the initial geographic location message 402 is sent to the security engine 316. Information included in the initial geographic location message 402 includes information to assist the security engine 316 to determine whether to facilitate access to a geographic location associated with the geographic location identifier 315. For example, the initial geographic location message 402 may include a variety of information regarding a geographic location, such as threshold requirements 312, geographic location information 314 (which may include a digital map), geographic location identifier 315, and security key 317. Initial geographic location message 402 may be sent in response to an owner/agent inputting information into a geographic location profile that indicates the geographic location associated with geographic location identifier 315 is available for access by entrants. Initial geographic location message 402 may include scheduling information regarding the available times/dates the geographic location is open for access.

Additionally, system 300 includes an entrant request 404 for access to a geographic location. As illustrated, entrant request 404 is sent to security engine 316. In aspects, the entrant request 404 includes information that aids the security engine 316 in determining whether to facilitate an entrant's access to one or more geographic locations. For instance, the entrant request 404 may include the general type of property that the entrant wishes to access (for example, price range, size, and location) or may include the specific address/geographic identifier that the entrant would like to access. The entrant request 404 may also include information about the entrant. This may include entrant information 304, entrant location information 306, and entrant identification 308. The entrant request 404 may be sent in response to an entrant interacting with an application that identifies potential geographic locations that the entrant wishes to access and/or by filling out an entrant profile.

The security engine 316 may send a reference request 406 to a social network engine 328. In aspects where a threshold requirement is an in-network reference, the message may be a request for specific reference. In aspects, the social network engine 328 will send a reference response 407 to the security engine if and when the social network engine 328 receives an in-network reference. Alternatively, the reference request may be to identify the number of people an entrant and a user have in common in a network. For example, an entrant and the owner/agent of the geographic location may have 15 people that the entrant and owner are commonly are connected to. This information may be sent back to the security engine in a reference response 407.

After receiving an entrant request 404, the security engine 316 may perform one or more security checks using security check module 318 using the information received from the entrant request 404, the initial geographic location message 402, and/or the reference response 407. If the security engine 316 determines that the entrant meets the requirements to receive the security key (for example, by passing threshold requirements), the security engine 316 may send a security message 408 to the access engine 320. The security message 408 may include the copy of the security key 326 and associate the copy of the security key 326 with the entrant identification 308. This information may be stored in the access engine. The security message 408 may also include scheduling information, indicating the time/date in which an entrant may access a geographic location. The scheduling information may also be associated with the entrant identification 308.

In aspects, an access approval message 409 may be sent to the entrant engine 302. The access approval message may include information related to one or more dates/times that the entrant associated with the entrant information 304 may access a geographic location (which geographic location is associated with the geographic location identifier 315).

In aspects, the entrant engine 302 sends an entrant access request 410 to the access engine 320. The entrant access request 410 includes the entrant location information 306 and the entrant identification 308, for example. The entrant identification 308 and entrant location information 306 may be used by the authorization module 324, along with the information included in the security message 408 to approve/deny access to a geographic location. In aspects, an access response 412 is sent to the entrant engine 302. The access response 412 may include the security key when the entrant has been approved, may contain a denial message, or may ask for additional information. The security key may then be used by an entrant device electronically coupled to the entrant engine 302 to facilitate access to a geographic location. For example, the entrant module 302 may cause the entrant device to display the security key or (in cases where the security key is a key to a lock box, for example) the entrant engine 302 may program a tag on an RFID enabled entrant device.

Figure 5A:
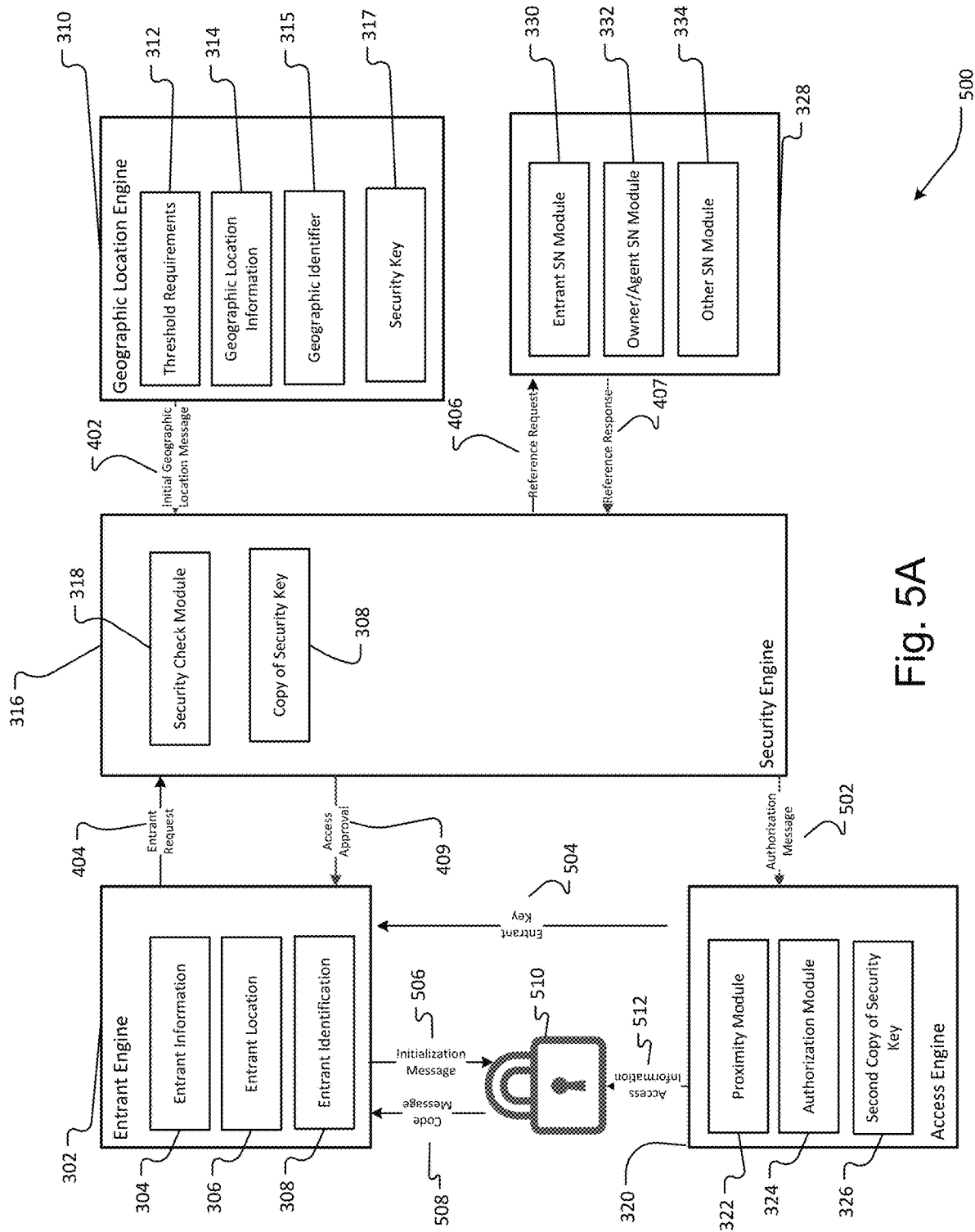
FIG. 5A illustrates a system of communication streams for facilitating access to geographic locations.

FIG. 5A illustrates a system 500 of communication streams for facilitating access to geographic locations. It will be appreciated that elements in FIG. 5A like numbered as elements in FIG. 3 and/or FIG. 4 will have the same or similar properties as those discussed with reference to FIG. 3 and/or FIG. 4, respectively.

In addition to entrant request 404, initial geographic location message 402, reference request 406, reference response 407, and access approval message 409, FIG. 5A includes an authorization message 502. In aspects, authorization message 502 is a message that includes information related to an entrant, such as entrant identification 308, and entrant information 304. Additionally, authorization message may include information that the security engine 316 has cleared an entrant associated with entrant identification 308 for access to a geographic location associated with geographic location identifier 315. In some aspects, scheduling information is included in the authorization information.

When the authorization message 502 includes information that an entrant is approved to access a geographic location, the access engine 320 sends an entrant key message 504 to the entrant engine 302. In aspects, entrant key message 504 may be a message that includes an encrypted security key that is decrypted by a code included in a code message 508 that is sent by security device 510 after an initialization message 506 is sent from the entrant engine 302.

For example, the entrant engine 302 may receive a code message 508 when a device associated with the entrant (such as a smart phone or RFID tag) is in physical proximity to the security device 510. In aspects, the code message 508 is sent after the entrant engine 302 sends an initialization message 506 to the security device 510. The initialization message 506 may include an energy wave to energize a security device 510 that is a simple RFID tag, for example. In such an embodiment, the code message 508 may be sent (or a device associated with the entrant engine 302 may read) the code message 508 on the security device 510. The code in the code message 508 may be used to decode the key in the entrant key message 504. The result may be to enable the encrypted copy of the security code (which may be sent in the entrant key message 504) to be read using the code.

In some aspects, the security device 510 is capable of storing and processing information. For example, the security device 510 may include a computer with RFID/NFC capability. The security device 510 may receive access information 512 from the access engine 320. This may include the code that is sent in the code message 508. Indeed the access engine 320 may associate the code in the code message 508 with the entrant identification 308. Further, the access information 512 may include an expiration time for a code associated with entrant information. Alternatively, the access engine 320 may send a command to add/enable an entrant (as identified using the entrant identification 308) to receive a code, and may later send a command to delete/disable an entrant to receive a code using the access information 512.

For example, the initialization message 506 may include (or be associated with) the entrant identification 308. The entrant identification 308 may be used by the security device 510 to determine if there is an enabled code associated with the user. If the security device determines that the entrant identification 308 is authorized to receive the code message 508, the code message is sent. In embodiments, this code message 508 includes information sufficient to decode the key in the entrant key message 504. Correspondingly, the entrant key message 504 may include an encrypted security key encrypted for particular entrants associated with an entrant identification 308. If the entrant is not authorized, the code message may be a message that states the entrant is not authorized to receive the code.

In additional/alternative aspects, the security device 510 receives the initialization message 506, which message includes the entrant identification 308. The entrant identification 308 may be used by the security device 510 to determine whether the entrant is authorized to access the security device 510. Upon making a determination that the entrant identification 308 is allowed access, the security device 510 may display a security key or actuate a locking mechanism.

Figure 5B:
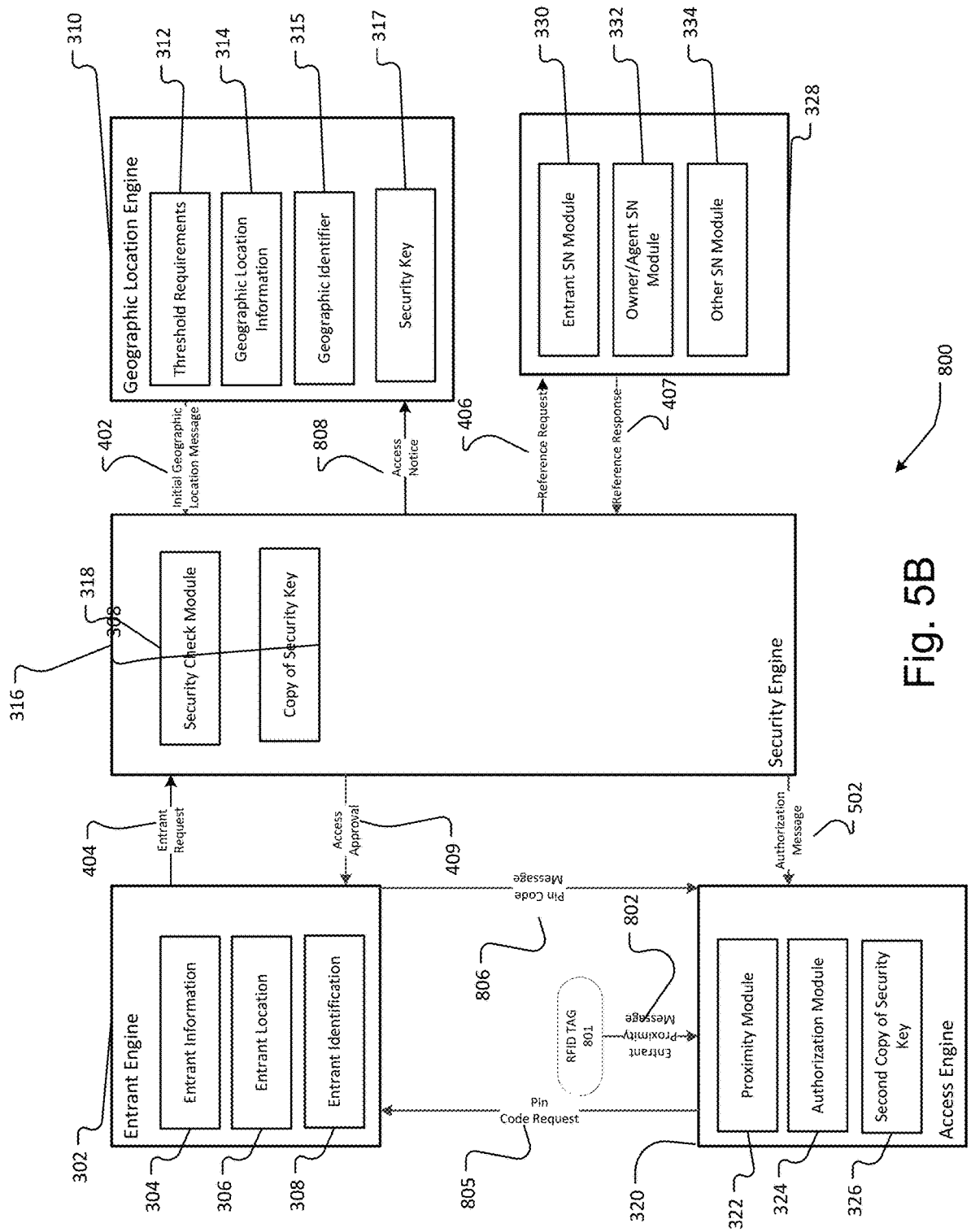
FIG. 5B illustrates a system of communication streams for facilitating access to geographic locations.

FIG. 5B illustrates a system 800 of communication streams for facilitating access to geographic locations. It will be appreciated that elements in FIG. 12 like numbered as elements in FIG. 3, FIG. 4 and/or FIG. 5A will have the same or similar properties as those discussed with reference to FIG. 3, FIG. 4 and/or FIG. 5A, respectively.

FIG. 5B includes an RFID tag 801. The RFID tag 801 may include data that associates the tag with an entrant information 304 and or entrant identification 308. The RFID tag 801 may be read by an RFID antenna, and the information included in the RFID tag sent to the access engine 820 via entrant proximity message 802. The access engine may then determine that the entrant is in physical proximity to geographic location (such as, for example, when the RFID antenna is on the geographic location). The proximity module may then determine that the entrant is authorized for access and actuate a lock or display a security key.

In some access, the reading of the RFID tag 801 and approval of access by the authorization module 324 prompts the access engine to send a request for a pin code to the entrant engine 302. The entrant engine 302 may facilitate obtaining a pin from an entrant (such as for example, the entrant module being stored on an entrant device and receiving a pin code via an input device of the entrant device). This pin code may be sent back to the access engine 320. The access engine may then determine that the pin is verified (based on, for example a pin code sent in authorization message 502). The access engine may then facilitate access to the geographic location.

FIG. 5B also includes access notice 808. Access notice 808 may include information regarding who accessed the geographic location. The information regarding the entrant(s) may be anonymized and may include only general information such as average loan approval amount, total number of views, total time on location (which may be gathered from location information), etc. In other embodiments, the access notice may include individual entrant information, but the identity and other personal identifying information of an entrant may be hidden. For example, an entrant identification number 308 may be provided but all other personal identifying information may be hidden.

In some embodiments, access notice includes specific times that the entrant (as indicated by the GPS coordinates of the entrant's device, for example) were at the geographic location.

Figure 6:
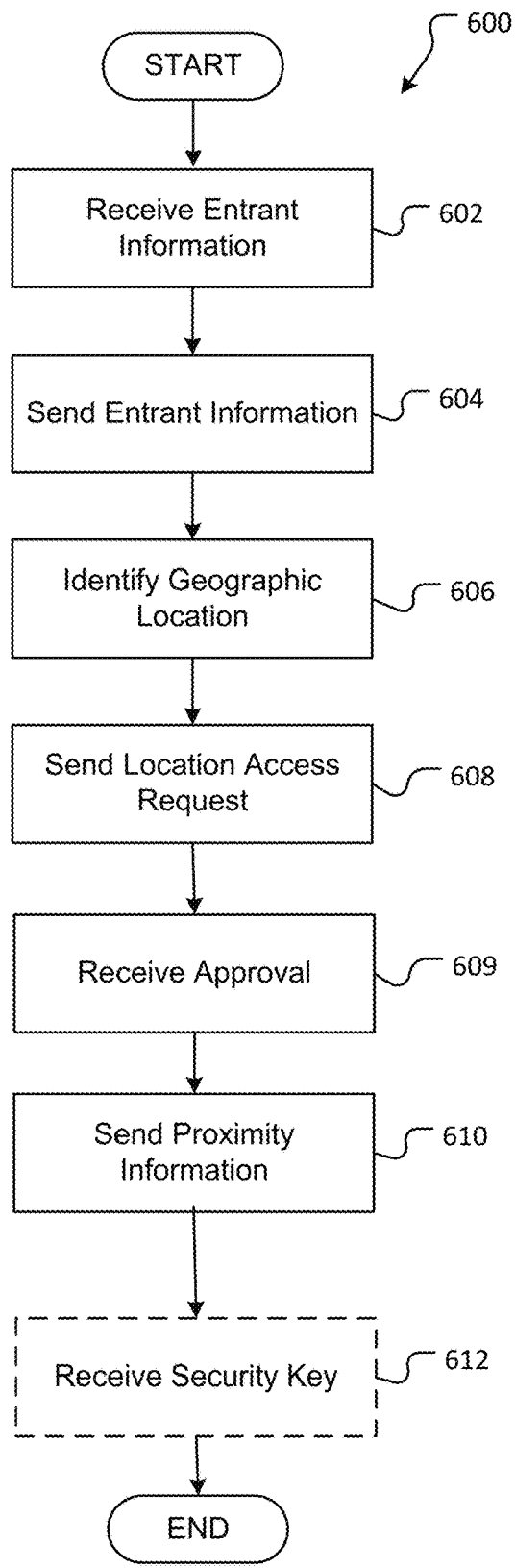
FIG. 6 is a method of gaining access to geographic location

FIG. 6 is a method 600 of gaining access to a geographic location. Method 600 includes receive entrant information operation 602. In operation 602, various entrant information is received, including entrant information described above. This may be received from a variety of places including direct input from a computing device, a third party database, a social networking database, and the like.

Method 600 proceeds to send entrant information operation 604. In operation 604, the entrant information is sent. In aspects, the entrant information is sent to a security engine to be used to process future or past requests to access a geographic location.

The method 600 then proceeds to identify geographic location operation 606. In operation 606, a particular geographic location or a type of geographic location is identified. This may be based on entrant preference. The entrant may input preference information as to the type of location an entrant wants access to. This information may then be compared to a database of geographic locations that are available for access. A list or grouping of available geographic locations may be identified. Operation 606 may include receiving the list from a networked database.

Method 600 then proceeds to send location access request operation 608. In operation 608, access to the specific location(s) identified in operation 606 is requested. A message may be sent to a security engine, for example, to request approval to access said locations.

Method 600 then proceeds to receive approval operation 609. The approval includes information about which geographic locations the entrant is approved to access. The approval may also include schedule information (such as when the geographic location is available for access), special instructions about the geographic location, and/or further information about the geographic location.

Method 600 then proceeds to send proximity information operation 610. In aspects, proximity information is sent in operation 610 when a device associated with the entrant is near a geographic location. For example, GPS data may be sent to a security device indicating that an entrant is on the property and would like access to the geographic location. Additionally, the proximity information may be sent using RFID, such as an entrant holding a tag or RFID enabled device up to an RFID reader and/or tag. In some instances, sending proximity information operation 610 may also include sending a pin code. The combination of a pin code known to the entrant as well as proximity information may assist in verifying that the entrant is the one who is in possession of the device.

Method 600 then optionally proceeds to receive security key operation 612. In operation 612, a security key is received. Alternatively/additionally, a locking mechanism may actuate when a user sends proximity information in operation 610. The method then ends.

Figure 7:
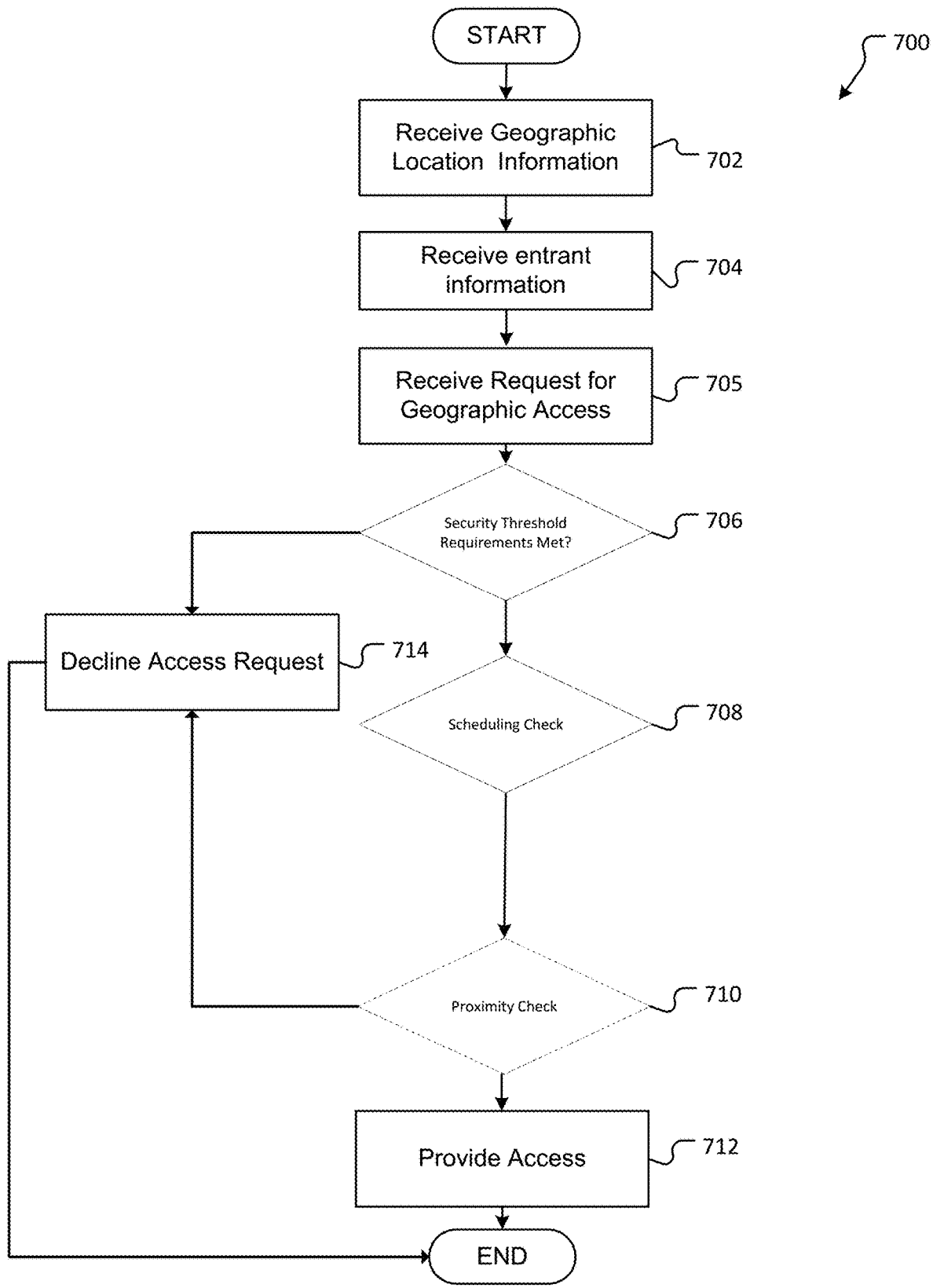
FIG. 7 is a method for authorizing access to a geographic location.

FIG. 7 is a method 700 for authorizing access to a geographic location. Method 700 begins with receive geographic location information operation 702. In operation 702, geographic location information is received. This may be similar or the same as the geographic location information discussed above. Information may be received from an agent/owner of a geographic location or another location, such as a database.

Method 700 then proceeds to receive entrant information operation 704. In operation 704, entrant information is received. Entrant information may be the same as or similar to the entrant information discussed above.

The method 700 then proceeds to receive request for geographic access operation 705. In operation 705, a request to access a geographic location is received.

Method 700 then proceeds to determination 706. In determination 706, it is determined whether one or more security thresholds are met. The security thresholds may be the same as or similar to the security thresholds described above. For example, geographic location information and entrant information may be used to facilitate the security check. If it is determined that the thresholds are met, method 700 proceeds to scheduling determination operation 708. If the threshold requirements are not met, the method proceeds to decline access request 714, where the access request is declined.

In scheduling determination operation 708, it is determined whether the access request is during the scheduled time for the geographic location to access. For example, the geographic location may include times in which the location may be accessed by any entrant or by a particular entrant. If it is determined that it is a time for access, the method optionally proceeds to proximity determination 710. If it is determined that the time/date is outside the time for an entrant/any entrant to gain access to geographic location, the method 700 proceeds to decline access request.

The method then optionally proceeds to proximity determination 710. In proximity determination 710, it is determined whether the entrant is located near the geographic location. Proximity determinations may be made as described above. If it is determined that the entrant is proximate to the geographic location, the method proceeds to provide access to geographic location operation 712, where access is provided such as by sending a security code a key, or actuating a device.

Figure 8:
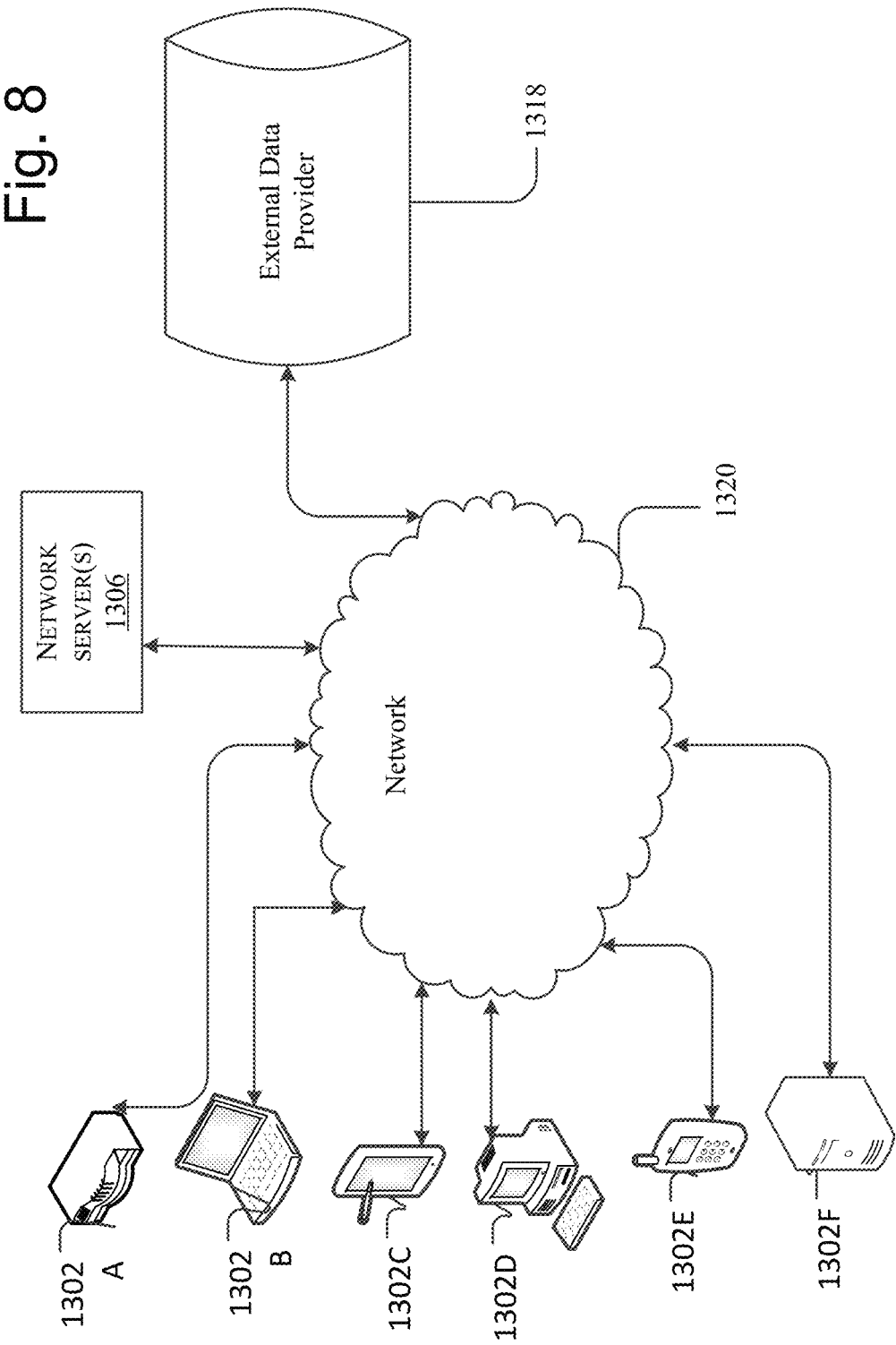
FIG. 8 is an example diagram of a distributed computing system in which aspects of the present invention may be practiced.

FIG. 8 is an example diagram of a distributed computing system in which aspects of the present invention may be practiced. According to examples, any of computing devices 1302A (a modem), 1302B (a laptop computer), 1302C (a tablet), 1302D (a personal computer), 1302E (a smart phone), and 1302F (a server) may contain modules, components, engines, etc. for granting access to a geographic location. Additionally, according to aspects discussed herein, any of computing devices 1302A-F may contain necessary hardware for implementing aspects of the disclosure such as described above with regard to FIGS. 6 and 7. Any and all of these functions may be performed, by way of example, at network servers 1306 and/or server 1302F when computing devices 1302A-F request or receive data from external data provider 1318 by way of network 1320.

Figure 9:
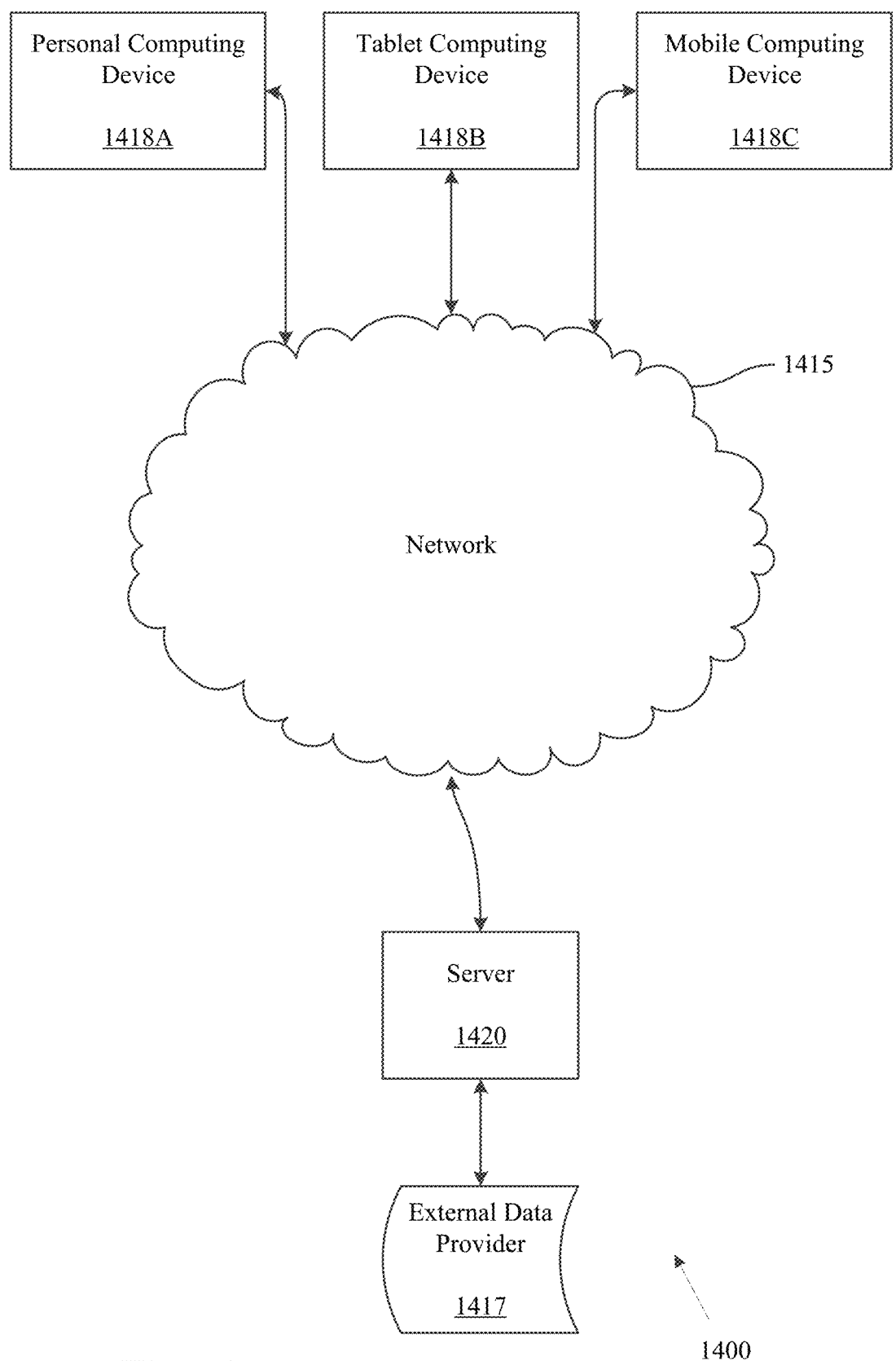
FIG. 9 is one embodiment of the architecture of a system for granting access to a geographic location.

Turning to FIG. 9, one embodiment of the architecture of a system for granting access to a geographic location is provided. Content and/or data interacted with, requested, or edited in association with one or computing devices may be stored in different communication channels or other storage types. For example, data may be stored using a directory service, a web portal, a mailbox service, an instant messaging store, or a compiled networking service for managing information related to entrants, geographic locations, security keys, and social networks. The system for granting access to secured geographic locations and executing the methods described herein may use any of these types of systems or the like for enabling data utilization, as described herein. A computing device 1418A, 1418B, and/or 1418C may provide a request to a cloud/network, which is then processed by a server 1420 in communication with an external data provider 1417. As one example, the server 1420 may provide a security key to the computing devices 1418A, 1418B, and/or 1418C through a network 1415. By way of example, a client computing device may be implemented as any of the systems described herein, and embodied in a personal computing device 1418A, a tablet computing device 1418B, and/or a mobile computing device 1418C (e.g., a smart phone). Any of these aspects of the systems described herein may obtain content from the external data provider 1417.

In various embodiments, the types of networks used for communication between the computing devices that makeup the present invention include, but are not limited to, an Internet, an intranet, wide area networks (WAN), local area networks (LAN), virtual private networks (VPN), GPS devices, SONAR devices, cellular networks, and additional satellite based data providers such as the Iridium satellite constellation which provides voice and data coverage to satellite phones, pagers and integrated transceivers, etc. According to aspects of the present disclosure, the networks may include an enterprise network and a network through which a client computing device may access an enterprise network. According to additional aspects, a client network is a separate network accessing an enterprise network through externally available entry points, such as a gateway, a remote access protocol, or a public or private Internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Operating environment 1400 typically includes at least some form of computer readable media. Computer readable media can be any available media that can be accessed by a processor such as processing device 1580 depicted in FIG. 10 and processor 1602 shown in FIG. 11 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1400 may be a single computer operating in a networked environment using logical connections to one or more remote computers. The remote computer may be a personal computer, a GPS device, a SONAR device such as a fish finder, a server, a router, a network PC, a peer device or other common network node, and typically includes many or all of the elements described above as well as others not so mentioned. The logical connections may include any method supported by available communications media. Such networking environments are commonplace in enterprise-wide computer networks, intranets and the Internet.

Figure 10:
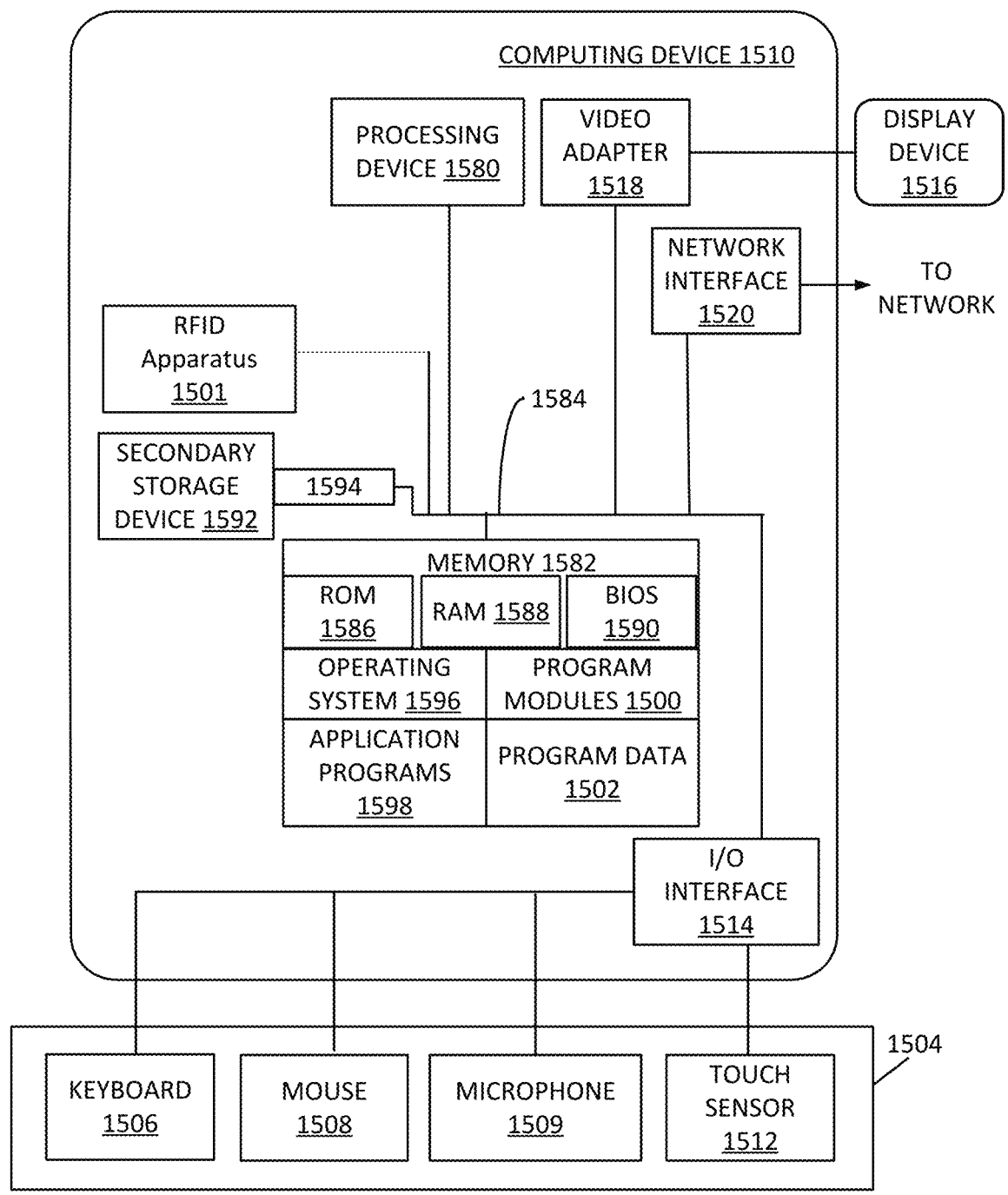
FIG. 10 illustrates one aspect in which an exemplary architecture of a computing device according that can be used to implement aspects of the present disclosure.

FIG. 10 illustrates one aspect in which an exemplary architecture of a computing device according that can be used to implement aspects of the present disclosure, including any of the plurality of computing devices described herein with reference to the various figures and their corresponding descriptions. The computing device illustrated in FIG. 10 can be used to execute the operating system, application programs, and software modules (including the software engines) described herein, for example, with respect to FIG. 11 and program modules 1614, security engine 1616, entrant engine module 1618, geographic location engine 1620, and access engine 1622. By way of example, the computing device will be described below as the geographic location device 1510. To avoid undue repetition, this description of the computing device will not be separately repeated herein for each of the other computing devices, including entrant computing device 102 (depicted in FIG. 1), geographic location computing device 116 (depicted in FIG. 1), server 106 (depicted in FIG. 1), security device 510 (depicted in FIG. 5A) computing devices 1302A-F (depicted in FIG. 8), computing devices 1418A-C (depicted in FIG. 9), and computing device 1600 (depicted in FIG. 11) but such devices can also be configured as illustrated and described with reference to FIG. 10.

The computing device 1510 includes, in some embodiments, at least one processing device 1580, such as a central processing unit (CPU). A variety of processing devices are available from a variety of manufacturers, for example, Intel, Advanced Micro Devices, and/or ARM microprocessors. In this example, the computing device 1510 also includes a system memory 1582, and a system bus 1584 that couples various system components including the system memory 1582 to the processing device 1580. The system bus 1584 is one of any number of types of bus structures including a memory bus, or memory controller; a peripheral bus; and a local bus using any of a variety of bus architectures.

Examples of computing devices suitable for the computing device 1510 include a server computer, a GPS/SONAR computer, an RFID/nearfield technology enabled computer device, a desktop computer, a laptop computer, a tablet computer, a mobile computing device (such as a smart phone, an iPod® or iPad® mobile digital device, or other mobile devices), or other devices configured to process digital instructions.

The computing device also includes an RFID apparatus 1501. The RFID apparatus 1501 includes may include an antenna, tag, and microprocessor, each of which may be in electronic communication with the other components of the computing device 1510 via the system bus 1584.

The signal of the RFID apparatus may be use a signal to communicate with other RFID enabled devices. The signal may be NFC-A, NFC-B, FelicCa, or any other RFID signal technology now known or later developed to be used in connection with the systems and methods described herein.

A tag associated with the RFID apparatus 1501 may be are an integrated circuit with information stored in the tags that can be read by other NFC devices. The information may include security keys, passcodes, or other information (such as entrant information or geographic information). Tag types may be read and re-write capable or read-only. The RFID apparatus described herein may use active mode or passive mode.

The system memory 1582 includes read only memory 1586 and random access memory 1588. A basic input/output system 1590 containing the basic routines that act to transfer information within computing device 1510, such as during start up, is typically stored in the read only memory (ROM) 1586.

The computing device 1510 also includes a secondary storage device 1592 in some embodiments, such as a hard disk drive, for storing digital data. The secondary storage device 1592 is connected to the system bus 1584 by a secondary storage interface 1594. The secondary storage devices 1592 and their associated computer readable media provide nonvolatile storage of computer readable instructions (including application programs and program modules), data structures, and other data for the computing device 1510. Details regarding the secondary storage devices 1592 and their associated computer readable media, as well as their associated nonvolatile storage of computer readable instructions (including application programs and program modules) will be more fully described below with reference to FIG. 11.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program modules or engines can be stored in secondary storage device 1592 or memory 1582, including an operating system 1596, one or more application programs 1598, other program modules 1500 (such as the software engines described herein), and program data 1502. The computing device 1510 can utilize any suitable operating system, such as Linux, Microsoft Windows™, Google Chrome™, Apple OS, and any other operating system suitable for a computing device.

According to examples, a user provides inputs to the computing device 1510 through one or more input devices 1504. Examples of input devices 1504 include a keyboard 1506, mouse 1508, microphone 1509, and touch sensor 1512 (such as a touchpad or touch sensitive display). Additional examples may include input devices other than those specified by keyboard 1506, mouse 1508, microphone 1509 and touch sensor 1512. The input devices are often connected to the processing device 1580 through an input/output interface 1514 that is coupled to the system bus 1584. These input devices 1504 can be connected by any number of input/output interfaces, such as a parallel port, serial port, game port, or a universal serial bus. Wireless communication between input devices and the interface 1514 is possible as well, and includes infrared, BLUETOOTH® wireless technology, cellular, RFID, NFC, and other radio frequency communication systems in some possible aspects.

In an exemplary aspect, a display device 1516, such as a monitor, liquid crystal display device, projector, or touch sensitive display device, is also connected to the system bus 1584 via an interface, such as a video adapter 1518. In addition to the display device 1516, the computing device 1510 can include various other peripheral devices (not shown), such as speakers or a printer.

When used in a local area networking environment or a wide area networking environment (such as the Internet), the computing device 1510 is typically connected to a network such as network 1320 shown in FIG. 8 and network 1415 shown in FIG. 9 through a network interface 1520, such as an Ethernet interface. Other possible embodiments use other communication devices. For example, certain aspects of the computing device 1510 may include a modem for communicating across the network.

The computing device 1510 typically includes at least some form of computer readable media. Computer readable media includes any available media that can be accessed by the computing device 1510. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 1510. Computer readable storage media does not include computer readable communication media or signals per se.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 10 is also an example of programmable electronics, which may include one or more such computing devices, and when multiple computing devices are included, such computing devices can be coupled together with a suitable data communication network so as to collectively perform the various functions, methods, or operations disclosed herein.

Figure 11:
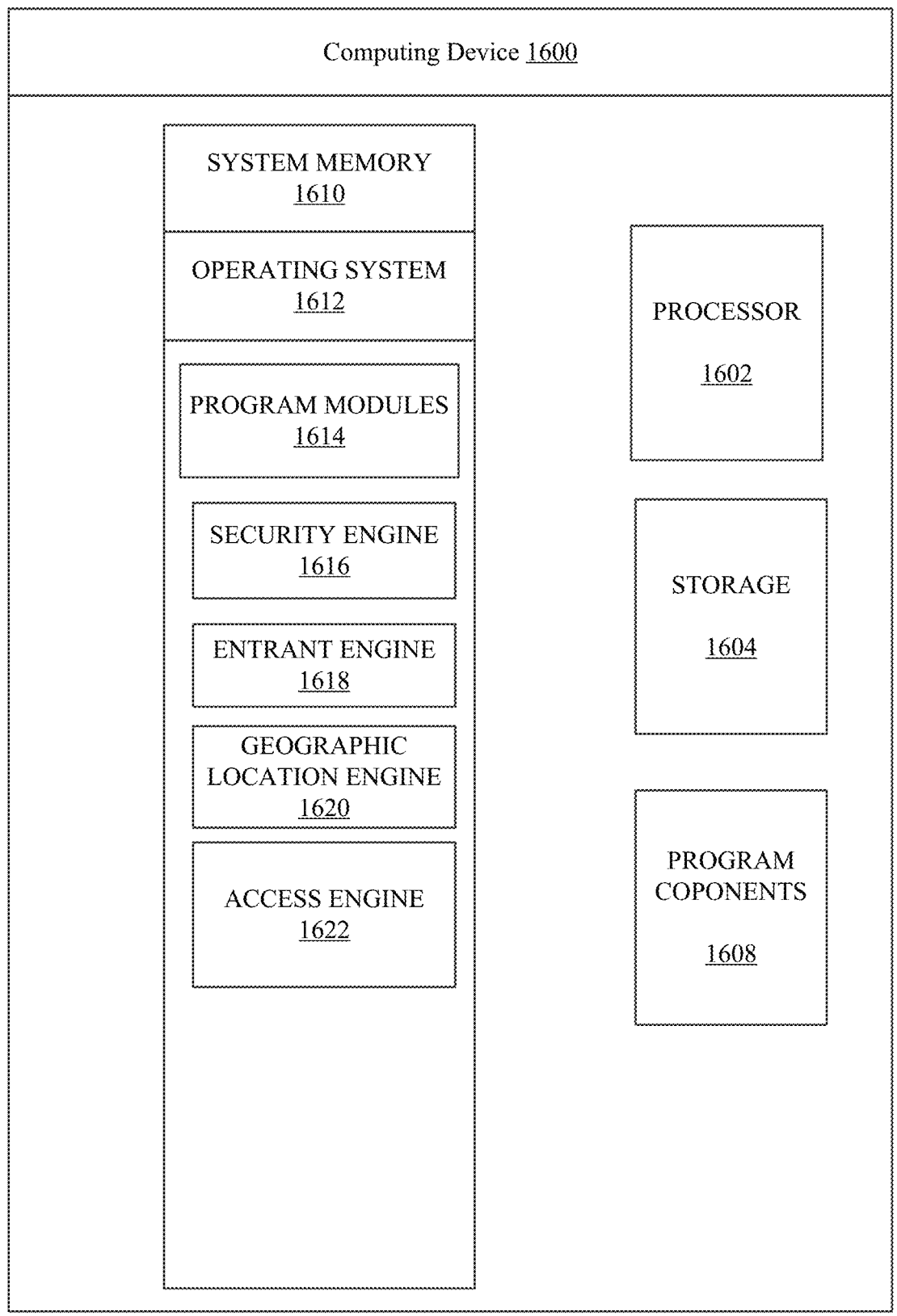
FIG. 11 is a block diagram illustrating additional physical components (e.g., hardware) of a computing device.

FIG. 11 is a block diagram illustrating additional physical components (e.g., hardware) of a computing device 1600 with which certain aspects of the disclosure may be practiced. The computing device components described below may have computer executable instructions for determining threshold requirements and proximity thresholds to facilitate access to a geographic location. Indeed computing device 1600 may be operatively programmed to perform the methods described with reference to FIGS. 6 and 7, the security checks described with reference to FIG. 2, and/or the communication schema discussed with reference to FIGS. 4 and 5. Computing device 1600 may perform these methods and functions alone or in combination with a distributed computing network such as those described with regard to FIGS. 8 and 9, which may be in operative contact with personal computing device 1418A, tablet computing device 1418B and/or mobile computing device 1418C which may communicate and process one or more of the program modules described in FIG. 11 including security engine 1616, entrant engine 1618, geographic location engine 1620, and access engine 1622. According to additional examples, computing device 1600 may be in communicative contact via the distributed computing networks described in FIGS. 8 and 9 and computing device 1600 may comprise and describe any of components 1302A, 1302B, 1302C, 1302D, 1302E and 1302F. Additionally, computing device 1600 may represent computing devices 102, 106, 116, 1510 as described above.

In a basic configuration, the computing device 1600 may include at least one processor 1602 and a system memory 1610. Depending on the configuration and type of computing device, the system memory 1610 may comprise, but is not limited to, volatile storage (e.g., random access memory), non-volatile storage (e.g., read-only memory), flash memory, or any combination of such memories. The system memory 1610 may include an operating system 1612 and one or more program modules 1614 suitable for performing dynamic updating of contour maps for bodies of water, such as one or more components in regards to FIG. 16 and, in particular, data reception module security engine 1616, entrant engine 1618, geographic location engine 1620, and access engine 1622. The operating system 1612, for example, may be suitable for controlling the operation of the computing device 1600. Furthermore, aspects of the disclosure may be practiced in conjunction with a graphics library, other operating systems, or any other application program and are not limited to any particular application or system.

The computing device 1600 may have additional features or functionality. For example, the computing device 1600 may also include additional data storage device (removable and/or non-removable) such as, for example, magnetic disks, optical disks, or tape. Such additional storage is illustrated in FIG. 16 by storage 1604. It will be well understood by those of skill in the art that storage may also occur via the distributed computing networks described in FIG. 8 and FIG. 9. For example, computing device 1600 may communicate via network 1320 in FIG. 12 and data may be stored within network servers 1306 and transmitted back to computing device 1600 via network 1320 if it is determined that such stored data is necessary to execute one or more functions described herein. Additionally, computing device 1600 may communicate via network 1415 in FIG. 9 and data may be stored within server 1420 and transmitted back to computing device 1600 via network 1415 if it is determined that such stored data is necessary to execute one or more functions described herein.

As stated above, a number of program modules and data files may be stored in the system memory 1610. While executing the processor 1602, the program modules 1614 (e.g., data reception module) may perform processes including, but not limited to, the aspects described herein. Other program modules that may be used in accordance with aspects of the present disclosure, and in particular may include a entrant engine, security engine, location engine, and social network engine.

Figure 12:
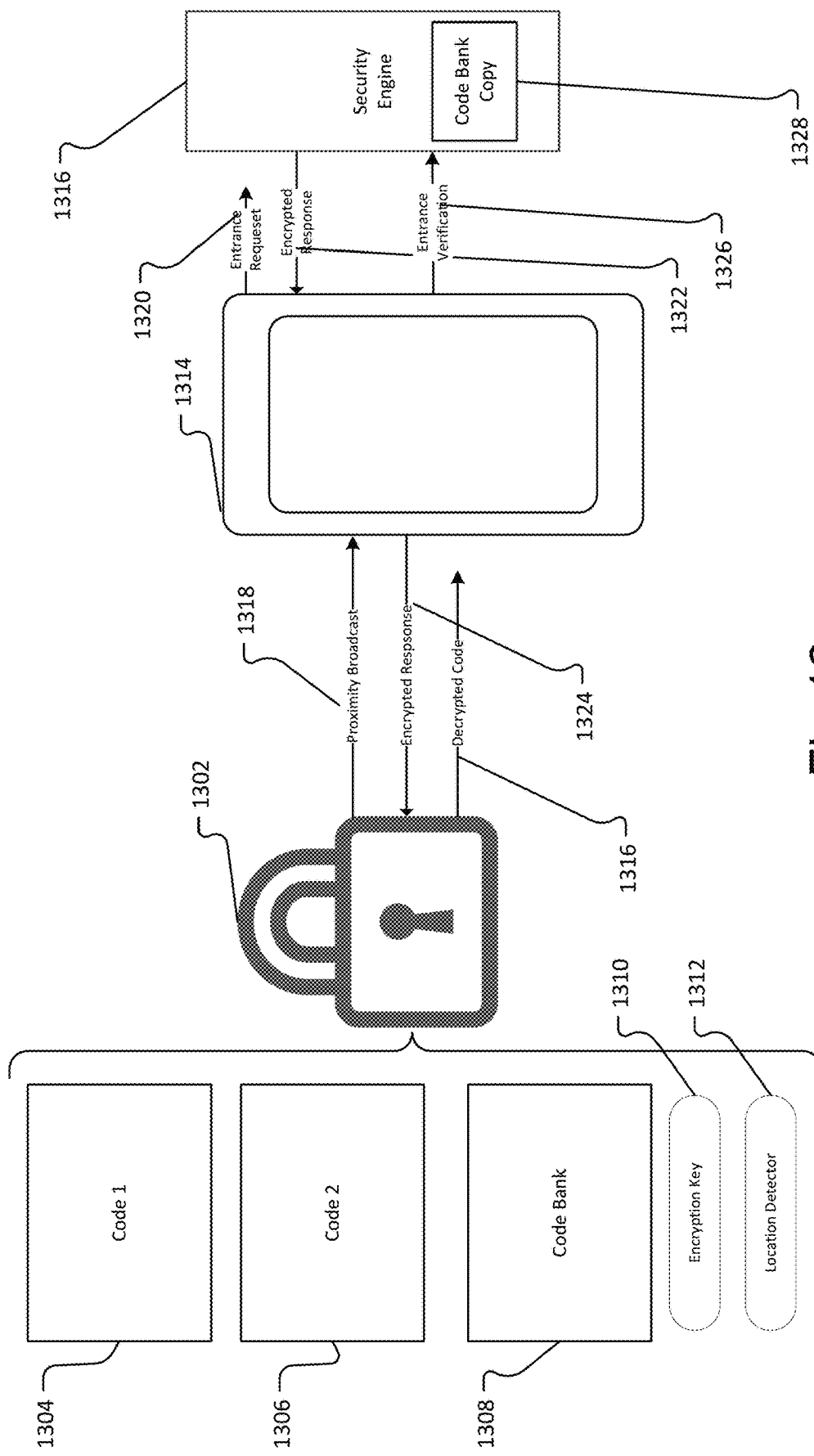
FIG. 12 illustrates an embodiment of a security system.

FIG. 12 illustrates an embodiment of a security system 1300 that may be used in combination with any of the systems described herein. As illustrated, a security device 1302 includes a first code 1304, a second code 1306, and code bank 1308, and encryption key 1310, and RFID tag 1312. Additionally illustrated are an entrant device 1314 and a security engine 1316.

The security device 1302 may be a computerized locking mechanism that stores a first code 1304, a second code 1306, and code bank 1308, an encryption key 1310, and an RFID tag 1312. The first code 1304 may be a semi-static code, which may be used to grant access to individuals that have code. For example, the code may be a punch key, an RFID tag, or other system to allow a user who has the code (such as an owner of the geographic location) access to the geographic location. Such code may be provided without necessarily going through a security engine, such as a security engine 1316.

The second code 1306 may be a rotating code that is used to allow an entrant associated with an entrant device 1310 and/or entrant profile (as described above) to enter a geographic location using the security engine 1316.

Facilitating access to a geographic location may occur as follows. The security device 1302 may send a proximity broadcast 1318, which proximity broadcast 1318 includes a encrypted information. The entrant device 1314 may receive the proximity broadcast 1318, and send the entrance request 1320 to the security engine 1316. The entrance request 1320 may include the encrypted information, which indicates to the security engine 1316 that the entrant device 1314 is near the security device 1302.

In response, the security engine 1316 may send an encrypted response 1322 to the entrant device 1314. The encrypted response 1322 may not be readable by the entrant device 1314. Rather, the encrypted response 1322 may include instructions that indicate that the entrant device 1314 may receive a second code 1306. A copy of the encrypted response 1324 is sent to the security device 1302.

The security device decrypts the encrypted response 1324 using an encryption key 1310, in embodiments. In response, the security device 1302 sends the second entrance code 1306 to the entrant device 1314.

In some aspects, the entrant device 1314 provides an entrance verification to the security engine. The entrance verification may include the time and date that the entrant device was provided with a decrypted code. In some aspects, the security engine has a copy of the code bank. Accordingly, if the security device 1302 was instructed to advance the code to the next code, the security engine 1316 would mirror the tracking of the security code using the code bank copy 1328. This may, in embodiments, aid the security device in detecting whether there has been a security breach.

In some aspects, the encrypted response 1324 also indicates how long the second code should remain valid. For example, in instances where an entrant associated with the entrant device 1314 is schedule to view a home for 2 hours, a 2 hour timer may be set. (Scheduling is discussed more in detail, above). After the two hour timer expires, the second code 1306 may be changed to another code from the code bank 1308. The change in the code will prevent an old code from being used outside the timer. Additionally, on expiration of the scheduled time, a message may be sent from the security engine 1316 to the entrant device 1314 informing the entrant device that the scheduled time has expired. Indeed, a location check (using for example, a GPS location of the entrant device) may be first performed to determine that the entrant device is still at the property. In some aspects, the security engine 1316 may send another message (such as to a geographic location owner via email, text, etc.) to indicate that the entrant is still in the geographic location past the time.

Figure 13:
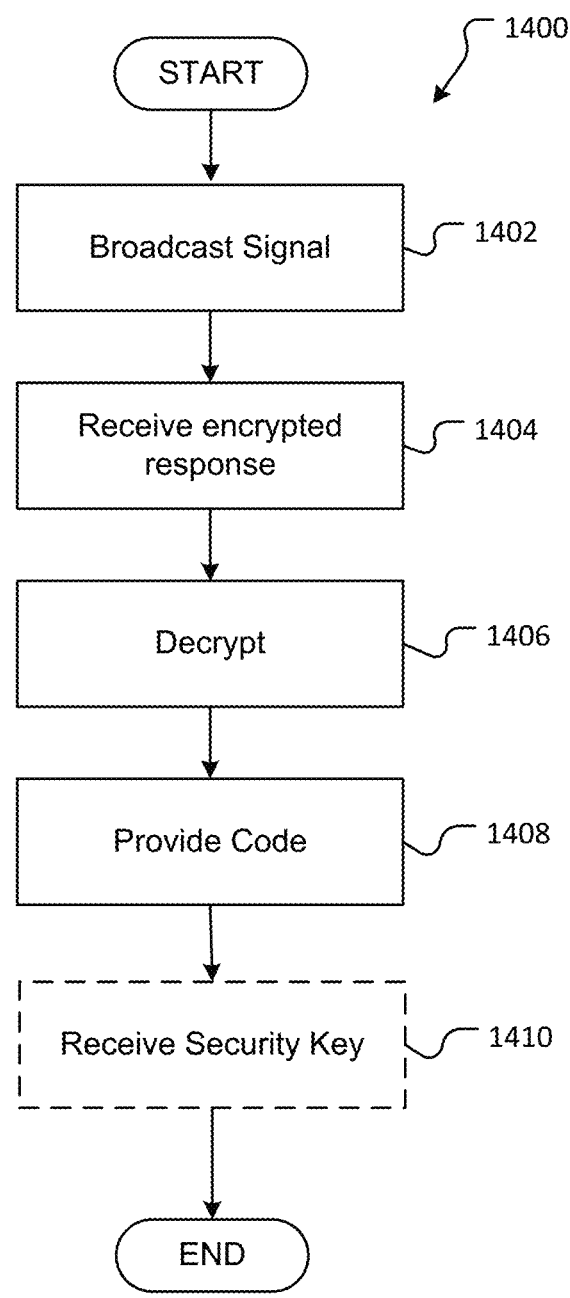
FIG. 13 illustrates a method for providing a code to an entrant device.

FIG. 13 illustrates a method 1400 for providing a code to an entrant device. The method begins with broadcast signal operation 1402. In 1402, a signal is broadcast using any variety of means including RFID, WIFI, or other communication means.

Method 1400 then proceeds to receive encrypted response operation 1404. In operation 1404, an encrypted response is received. The encrypted response may be received through any variety of methods, including the communication methods described above.

Method 1400 then proceeds to decrypt encrypted response operation 1406. In operation 1406, the encrypted response is decrypted. In embodiments, the response is decrypted using an encryption key. The response may include information instruction to send a decrypted code to a specific location, such as an email address, phone number (via text message), or to broadcast a code via RFID.

The method then proceeds to provide code operation 1408. In provide code operation 1408, a code is provided. The code may be previously set. In some embodiments, the code is provided according to instructions contained within the encrypted response (such as to an email address, to a text address, or broadcast via RFID).

Optionally, the method proceeds to change code operation 1410. This may occur, for example, where the instructions decoded in operation 1406 include instructions to change code. The code may be changed to the next code in a list. This list may have been taken from a code a code bank. That is, the code may be advanced to the next code in a list.

Figure 14:
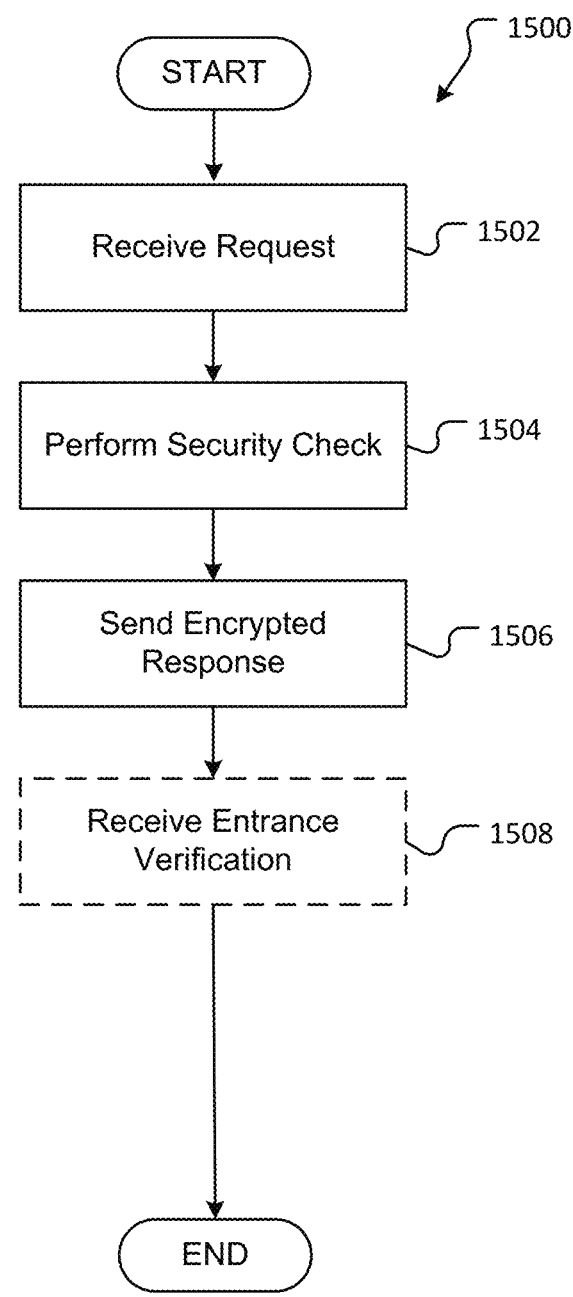
FIG. 14 illustrates a method of a security engine facilitating access to a geographic location.

FIG. 14 illustrates a method 1500 of a security engine facilitating access to a geographic location. Method 1500 begins with receive entrant request operation 1502. In operation 1502, and entrant request is received. The entrant request may include information sufficient enough to identify the entrant (such as by a device indicator) and information sufficient to identify that the entrant device is in proximity to the geographic location.

The method then proceeds to perform security/threshold check operation 1504. In operation 1504, one or more security checks are performed, which may be similar to or the same as those described above.

The operation then proceeds to send encrypted response operation 1506. In operation 1506, an encrypted response may be sent. The encrypted response may include timer information, as well as instructions to instruct a security device to provide an entrance device with a code.

The operation may optionally proceed to receive entrance verification operation 1508. In operation 1508, verification that the entrant has received a code may occur. In some embodiments, a code provided to an entrant is provided to a security engine. This may be provided by an entrant device or a security device. The security engine may verify that this code is the appropriate code (e.g., it is the next sequential code in the list). For example, a security engine may perform a check to determine whether it provided instructions to provide a code before it receives an entrant verification.

The various examples described above are provided by way of illustration only and should not be construed to limit the claims attached hereto. Those skilled in the art will readily recognize various modifications and changes that may be made without following the various aspects, examples and applications illustrated and described herein, and without departing from the true spirit and scope of the following claims.

The invention claimed is:

1. A computer implemented method comprising:
receiving geographic location information, the geographic location information including a plurality of security thresholds;
receiving entrant information;
comparing the entrant information to the security thresholds;
determining, based on the comparison, that an entrant associated with the entrant information may access a geographic location;
sending a notice to the entrant associated with the entrant information, the notice including at least one time and date that the entrant may access the geographic location, wherein the at least one time and date is determined from the geographic location information;
receiving a location of an entrant device associated with the entrant;
determining that the location is proximate to the geographic location;
determining that the current time and date matches at least one of the at least one time and date while the location is proximate to the geographic location;
performing at least one of: sending a security key to the entrant device associated with the entrant or actuating a locking mechanism.

2. The method of claim 1, wherein determining that the location of the entrant is determined by a NFC device reading a tag, wherein the tag is associated with the entrant; and further wherein the determining that the location is proximity to the geographic location is determined by identifying the NFC device as a device that is located proximate to the geographic location.

* * * * *